United States Patent
Foerster, Jr.

(10) Patent No.: US 10,337,551 B2
(45) Date of Patent: Jul. 2, 2019

(54) THREAD REPAIR INSERT AND METHOD OF USE

(71) Applicant: Gard Specialists Co., Inc., Eagle River, WI (US)

(72) Inventor: Thomas F. Foerster, Jr., Eagle River, WI (US)

(73) Assignee: GARD SPECIALISTS CO., INC., Eagle River, WI (US)

( * ) Notice: Subject to any disclaimer, the term of this patent is extended or adjusted under 35 U.S.C. 154(b) by 173 days.

(21) Appl. No.: 15/337,846

(22) Filed: Oct. 28, 2016

(65) Prior Publication Data

US 2017/0122359 A1    May 4, 2017

Related U.S. Application Data

(60) Provisional application No. 62/248,882, filed on Oct. 30, 2015.

(51) Int. Cl.
| | |
|---|---|
| *F16B 37/12* | (2006.01) |
| *F16B 25/02* | (2006.01) |
| *B23P 6/00* | (2006.01) |
| *F16B 25/00* | (2006.01) |

(52) U.S. Cl.
CPC .............. *F16B 37/127* (2013.01); *B23P 6/00* (2013.01); *F16B 25/0084* (2013.01)

(58) Field of Classification Search
CPC ... F16B 25/0052; F16B 37/125; F16B 37/127
USPC ....................... 411/178, 387.4, 417
See application file for complete search history.

(56) References Cited

U.S. PATENT DOCUMENTS

| | | | |
|---|---|---|---|
| 2,507,882 A * | 5/1950 | Berman | F16B 25/0015 411/417 |
| 3,081,808 A * | 3/1963 | Rosan | B21H 3/00 29/512 |
| 3,125,923 A * | 3/1964 | Hanneman | F16B 25/0021 411/386 |
| 4,425,066 A * | 1/1984 | Kollmann | F16B 25/0031 411/387.4 |
| 5,547,323 A * | 8/1996 | Fang | F16B 37/122 411/178 |
| 5,727,943 A * | 3/1998 | Beaty | A61C 8/0022 433/174 |

(Continued)

*Primary Examiner* — Flemming Saether
(74) *Attorney, Agent, or Firm* — Christopher A. Proskey; BrownWinick Law Firm

(57) ABSTRACT

A thread repair insert system having a cylindrical body that extends from an upper end to a lower end and includes a threaded exterior surface and a hollow interior having a threaded interior surface. The lower end of the cylindrical body includes a cutting section that includes a plurality of notches that separate threaded sections. The threaded sections include a cutting edge followed in the direction of rotation by a trailing edge. The lower end also tapers or narrows slightly such that the threaded sections transition from partial threads to full threads as they extend upward. As the thread repair insert is rotated into an opening in parent material, the cutting edge cuts material which is forced between the threads of the threaded sections. As the threaded sections transition from partial threads to full threads in the threaded sections, threads are roll-formed in the parent material.

16 Claims, 35 Drawing Sheets

(56) References Cited

U.S. PATENT DOCUMENTS

| | | | | |
|---|---|---|---|---|
| 6,217,331 B1* | 4/2001 | Rogers | ............... | A61C 8/0001 |
| | | | | 433/173 |
| 6,530,731 B2* | 3/2003 | Wheeler | ............... | F16B 37/127 |
| | | | | 29/525.11 |
| 7,140,825 B2* | 11/2006 | Takahashi | ........... | F16B 25/0021 |
| | | | | 411/387.8 |
| 8,628,286 B2* | 1/2014 | Duvekot | ................ | E04B 1/66 |
| | | | | 411/369 |
| 2008/0193252 A1* | 8/2008 | Barnsdale | ............. | F16B 37/127 |
| | | | | 411/109 |

* cited by examiner

THREAD REPAIR INSERT AND METHOD OF USE

CROSS-REFERENCE TO RELATED APPLICATIONS

The present application claims the benefit of U.S. Provisional Patent Application Ser. No. 62/248,882, filed Oct. 30, 2015, which is hereby incorporated by reference herein in its entirety, including any figures, tables or drawings.

FIELD OF THE INVENTION

This invention relates generally to a thread repair insert. More specifically, and without limitation, this invention relates a thread repair insert having a plurality of notches positioned in its lower end that is self-tapping and provides a repair for worn or damaged threads.

BACKGROUND OF INVENTION

Threaded openings are used in countless applications to thread one component into another. As one example, the heads on engines typically have a plurality of threaded openings in the parent material of the head that threadably receives a sparkplug therein. In this arrangement, the sparkplug is quickly and easily installed and removed by threading the sparkplug into or out of the threaded opening in the head. While this arrangement is convenient, effective and generally durable, a substantial problem is presented in the event that the threads in the parent material become worn or damaged.

There are several methods available to attempt to repair or rehabilitate worn or damaged threads. One such arrangement is known as tapping. Tapping is achieved by inserting a special insert into the threaded opening which attempts to re-align, or rehabilitate the existing threads. While tapping may be effective in some applications, tapping is generally limited to applications where only minor damage has occurred to existing threads. Generally speaking, tapping is ineffective if the existing threads are substantially worn or stripped. Tapping is certainly not effective when there is not enough material left to re-form the threads. Also, generally speaking, tapping is ineffective if there is substantial damage to the threads, like missing chunks, or substantial deformation. In addition, many forms of metal are not particularly well suited for or receptive to tapping. As such, substantial deficiencies exist in this method of repair.

Another method of repair includes the use of coil or mild steel inserts to replace the worn or damaged threads in the parent material. One example is that manufactured under the name HELICOIL® by Stanley Engineered Fastening, 480 Myrtle Street, New Britain, Conn. 06053. Another example is that manufactured under the name TAP-LOK™ by Groov-Pin Corporation, 1125 Hendricks Causeway, Ridgefield, N.J. For some applications repairs utilizing this method requires field boring the damaged threads, welding in an insert followed by field boring again followed by tapping the newly bored opening. While this method of repair is effective in some applications, this method suffers from many substantial disadvantages. Namely, replacement of the damaged threads in this manner is a labor and time intensive repair that requires a skilled craftsman equipped with highly specialized tooling. In addition, due to the material properties of these inserts, the repaired threaded opening tends to be weaker and less durable than the original threads. This often leads to premature failure of the repaired threads. As such, substantial deficiencies exist in this method of repair.

Several attempts have been made at developing thread repair inserts that resolve these and other deficiencies. One such example is presented in U.S. Patent Publication No. 2004/0136807 entitled "Thread Repair Insert" to Thomas F. Foerster Jr. which presents a thread repair insert having at least one containment recess therein. Other examples include U.S. Pat. No. 8,052,360 entitled "Self-Aligning Thread Tap and Method of Utilizing the Same to Tap Existing Bore Holes"; U.S. Pat. No. 7,819,613 entitled "Self-Tapping Insert and Method of Utilizing the Same to Replace Damaged Bores and Threads" and U.S. Pat. No. 8,439,617 entitled "Self-Tapping and Self-Aligning Insert to Replace Damaged Threads" all to Carl Strom. While these references teach methods or means of repairing damaged threads they all provide sub-optimal resolutions as the repairs themselves are weaker than the original threaded opening and therefore are susceptible to premature failure.

Therefore, for the reasons stated above, and for other reasons stated below which will become apparent to those skilled in the art upon reading and understanding the specification, drawings and claims there is a need in the art for an improved thread repair insert. Thus, an object of the invention is to provide a thread repair insert that improves upon the present state of the art.

Another object of the invention is to provide a thread repair insert that provides a rugged repair.

Yet another object of the invention is to provide a thread repair insert that provides a durable repair.

Another object of the invention is to provide a thread repair insert that that has a long useful life.

Yet another object of the invention is to provide a thread repair insert that is easy to install.

Another object of the invention is to provide a thread repair insert that is repeatable.

Yet another object of the invention is to provide a thread repair insert that can be installed without highly specialized tooling.

Another object of the invention is to provide a thread repair insert that can be easily installed.

Yet another object of the invention is to provide a thread repair insert that can be quickly installed.

Another object of the invention is to provide a thread repair insert that does not require a skilled machinist to install.

Yet another object of the invention is to provide a thread repair insert that provides exceptional tear out strength.

Another object of the invention is to provide a thread repair insert that provides exceptional pull out resistance.

Yet another object of the invention is to provide a thread repair insert that does not require a custom manufactured solution for each repair.

Another object of the invention is to provide a thread repair insert that eliminates the need for welding.

Yet another object of the invention is to provide a thread repair insert that can be used in countless applications.

Another object of the invention is to provide a thread repair insert that can be used with any kind of thread design or style.

Yet another object of the invention is to provide a thread repair insert that is safe to use.

Another object of the invention is to provide a thread repair insert that is safe to install.

Yet another object of the invention is to provide a thread repair insert that provides a cost effective repair.

Another object of the invention is to provide a thread repair insert that is efficient to use.

Yet another object of the invention is to provide a thread repair insert that eliminates the need to replace larger parts or components.

Another object of the invention is to provide a thread repair insert that provides optimal wear resistance.

Yet another object of the invention is to provide a thread repair insert that provides a permanent repair.

These and other objects, features, or advantages of the invention will become apparent from the specification and claims.

SUMMARY OF THE INVENTION

A thread repair insert includes a cylindrical body that extends from an upper end to a lower end and includes a threaded exterior surface and a hollow interior having a threaded interior surface. The lower end of the cylindrical body includes a cutting section that includes a plurality of notches that separate threaded sections. The threaded sections include a cutting edge followed in the direction of rotation by a trailing edge. The lower end also tapers or narrows slightly such that the threaded sections transition from partial threads to full threads as they extend upward. As the thread repair insert is rotated into an opening in parent material, the cutting edge cuts material which is forced between the threads of the threaded sections. As the threaded sections transition from partial threads to full threads in the threaded sections, threads are roll-formed in the parent material locking the thread repair insert into the parent material.

DETAILED DESCRIPTION OF THE INVENTION

Figure 1:
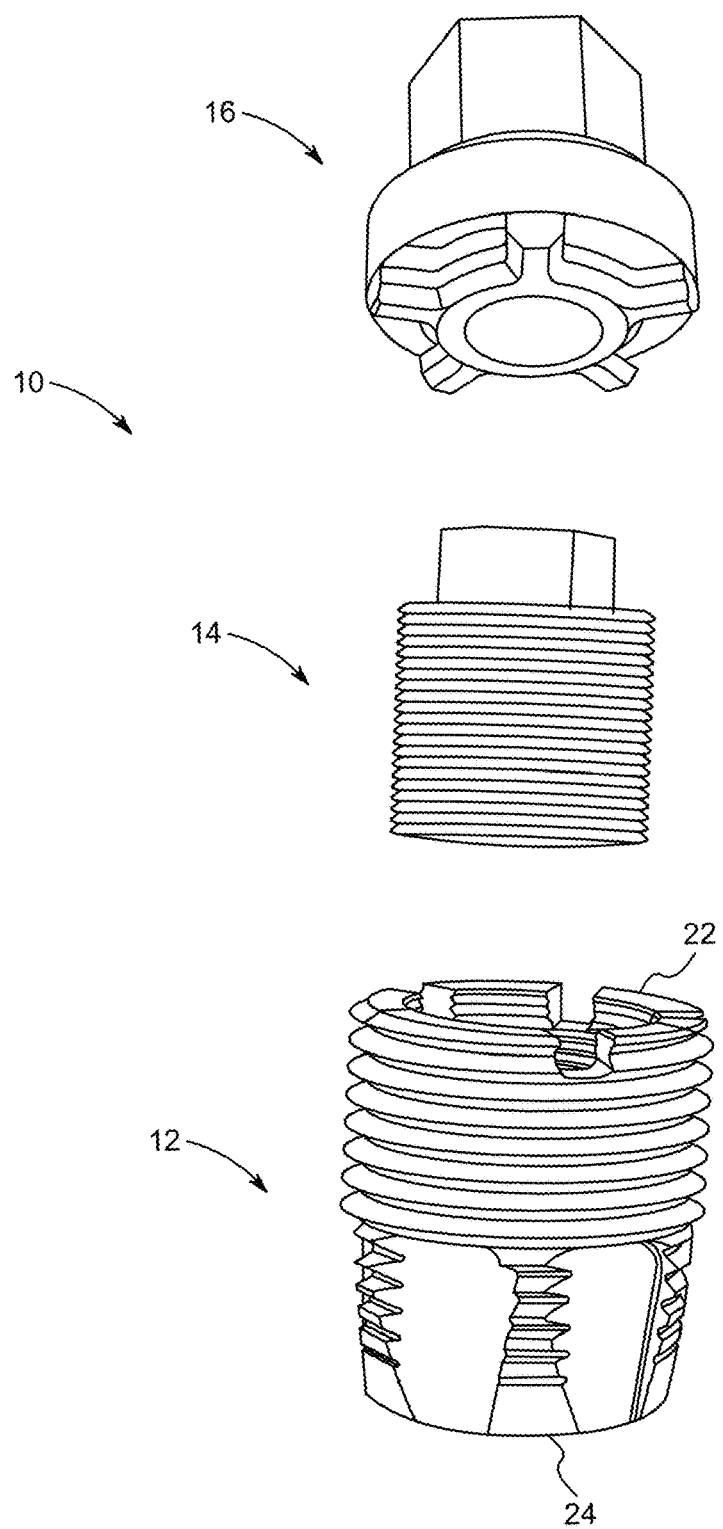
FIG. 1 is a perspective view of one embodiment of the thread repair insert system including the socket, the slug, and the thread repair insert as described herein.
Figure 2:
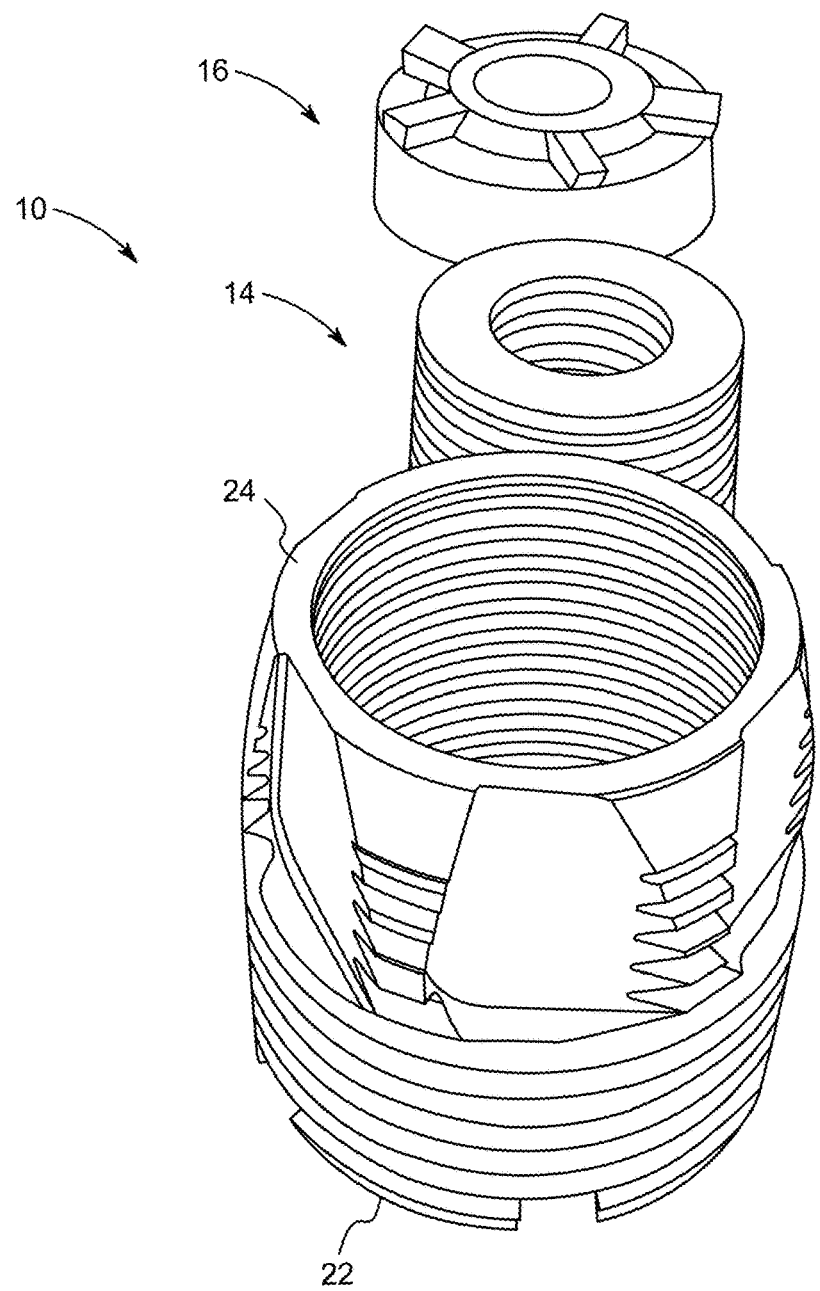
FIG. 2 is a perspective view of one embodiment of the thread repair insert system including the socket and the slug as described herein.
Figure 3:
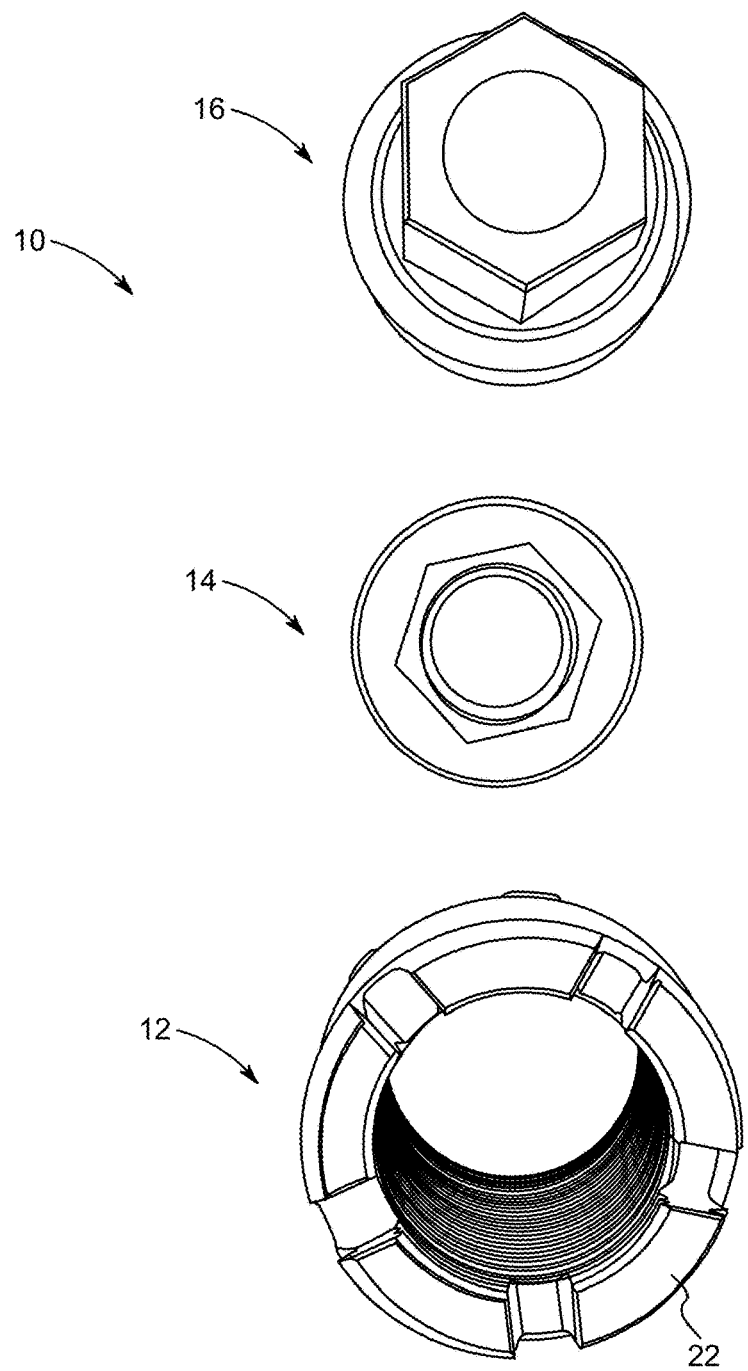
FIG. 3 is a top view of the thread repair system including the socket, the slug and the thread repair insert.
Figure 4:
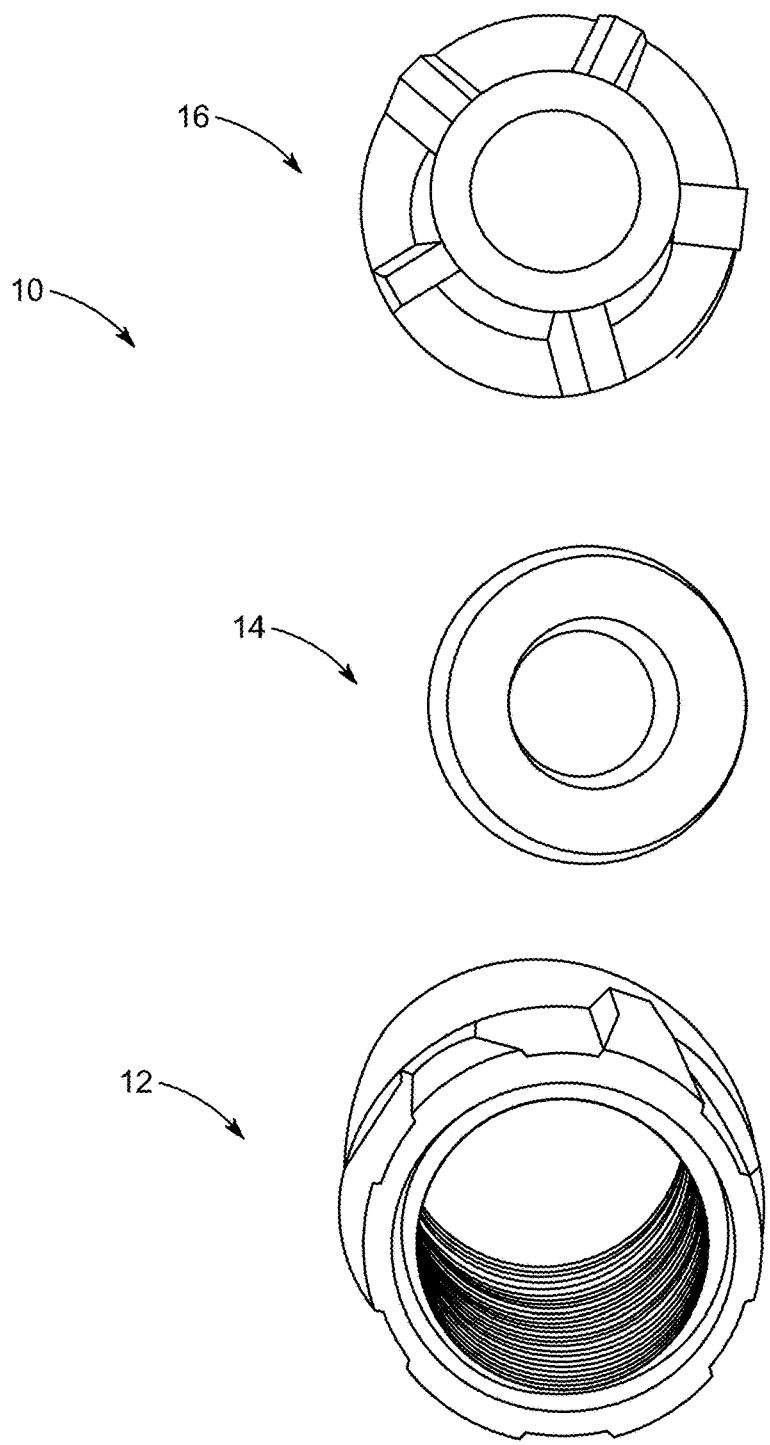
FIG. 4 is an end view of the thread repair system including the socket, the slug, and the thread repair insert.
Figure 5:
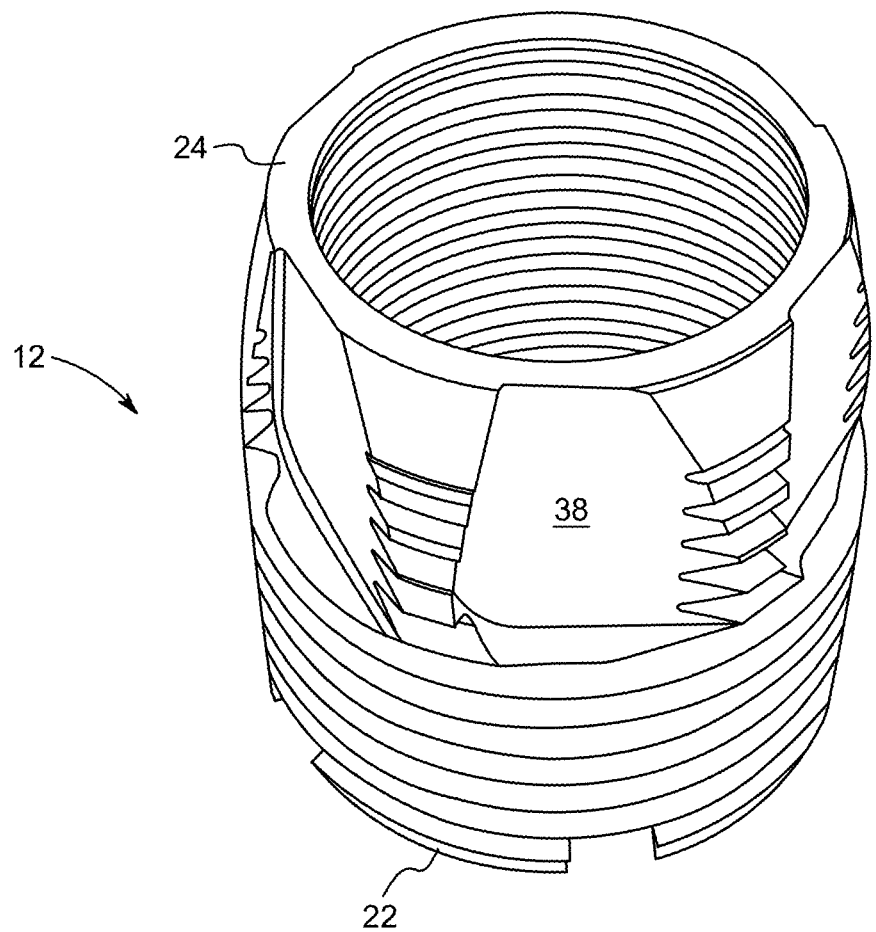
FIG. 5 is a perspective view of the thread repair insert from the lower end.
Figure 6:
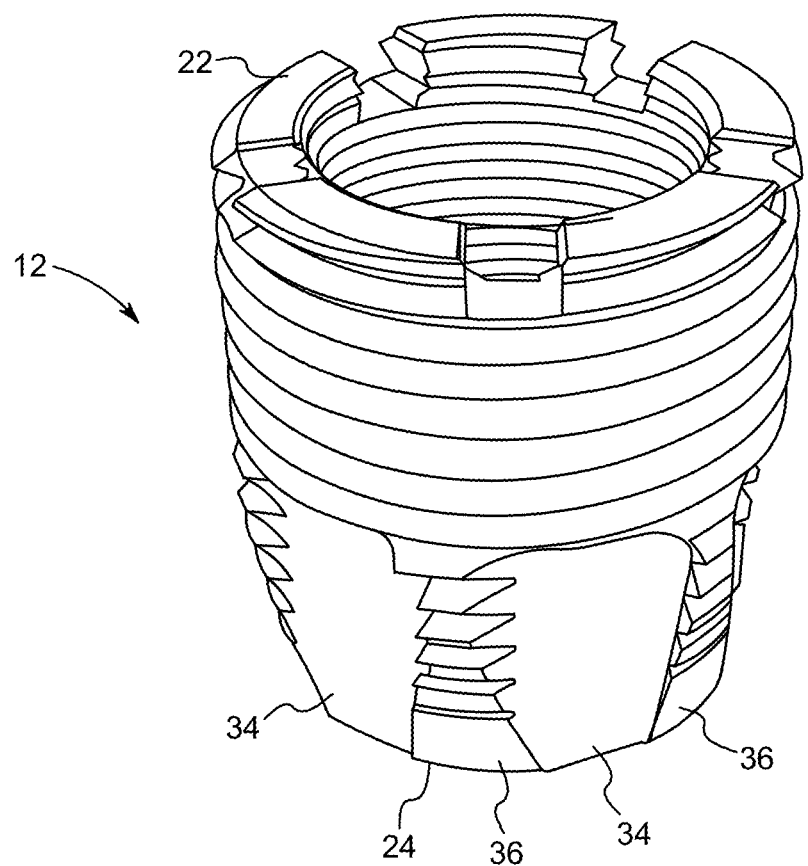
FIG. 6 is a perspective view of the thread repair insert from the upper end.
Figure 7:
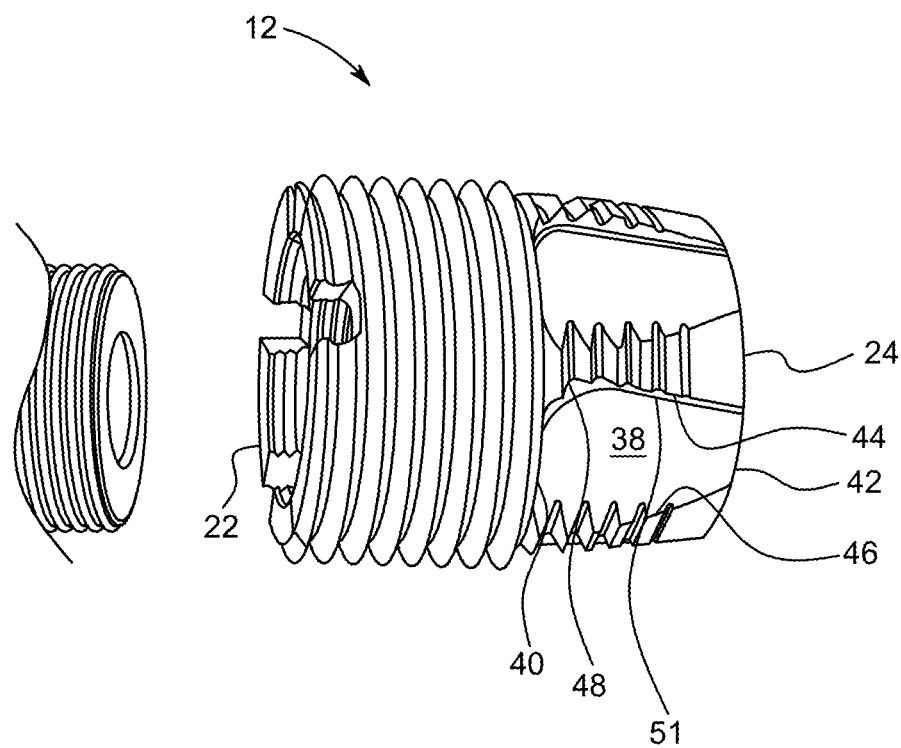
FIG. 7 is a side perspective view of the thread repair insert.
Figure 8:
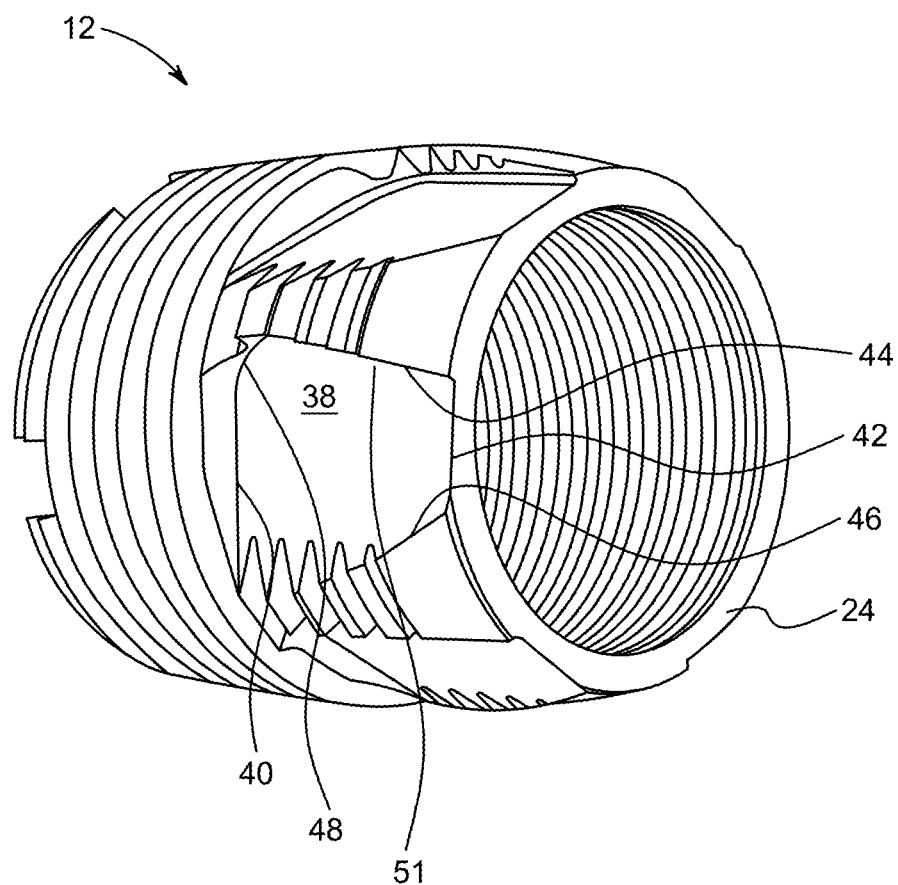
FIG. 8 is a perspective view of the thread repair insert from the lower end.
Figure 9:
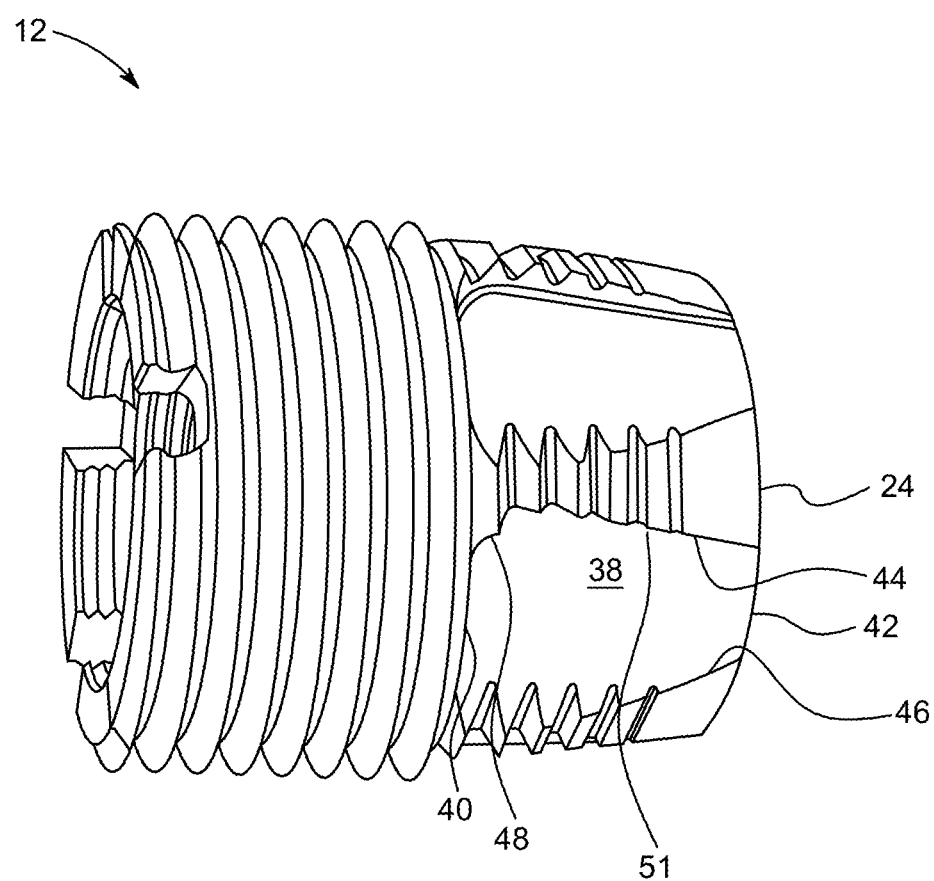
FIG. 9 is a side perspective view of the thread repair insert.
Figure 10:
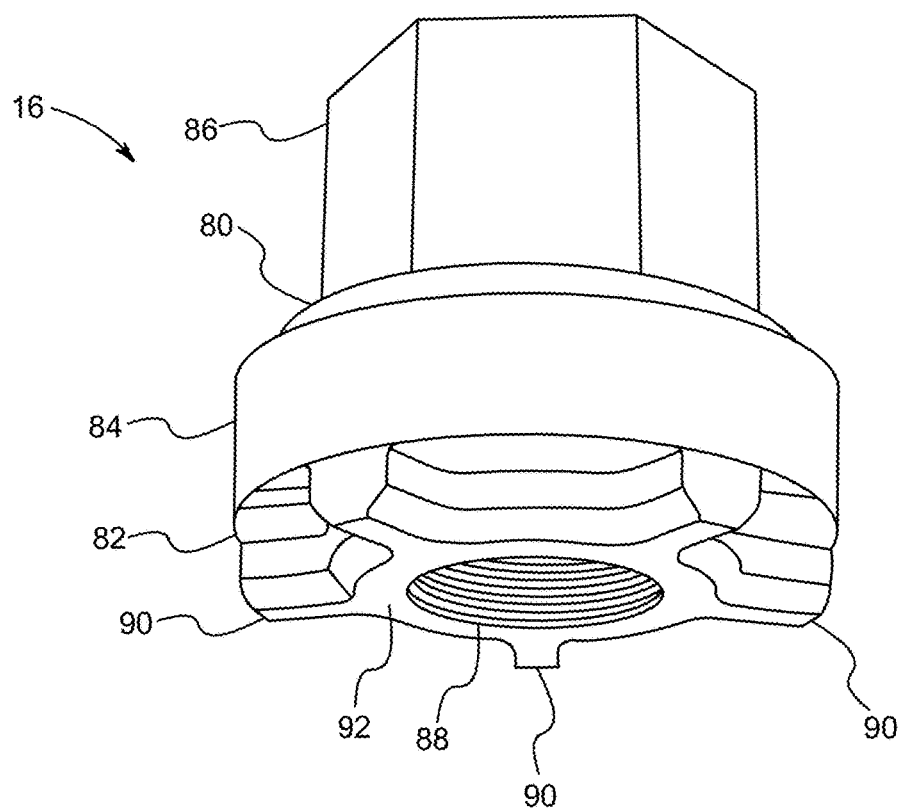
FIG. 10 is a side perspective view of the socket.
Figure 11:
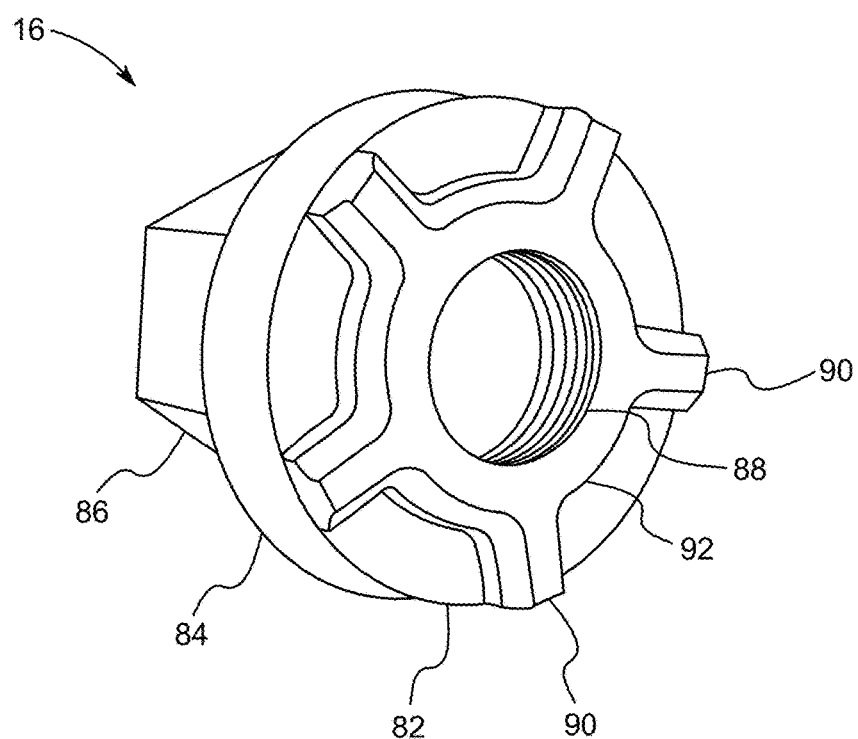
FIG. 11 is a perspective view of the socket from the lower end.
Figure 12:
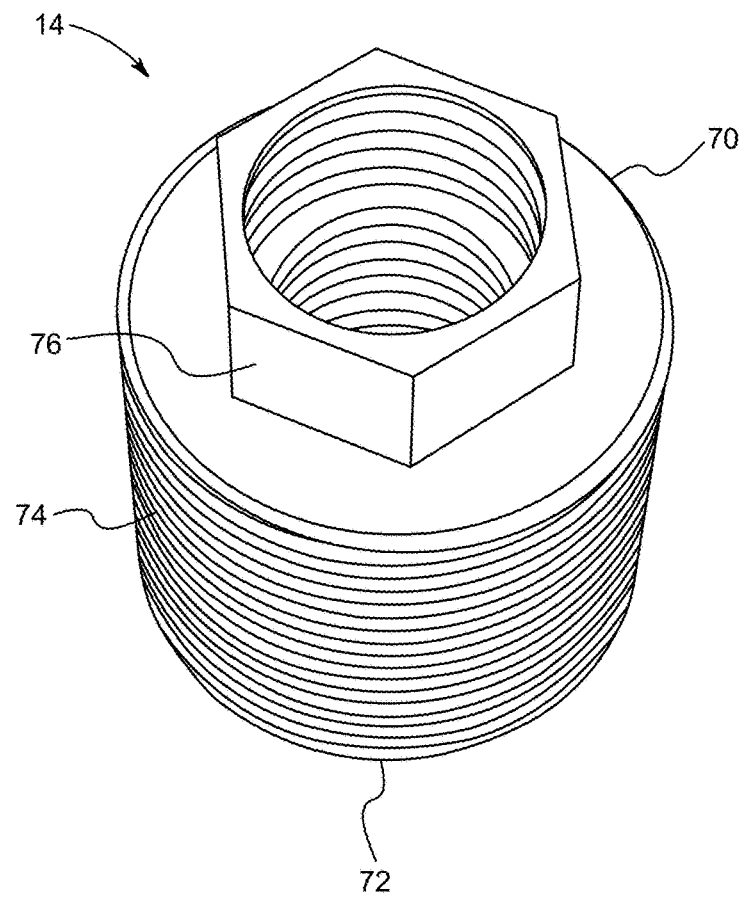
FIG. 12 is a perspective view of the slug from the upper end.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end and sides are referenced according to the views presented and may be used with respect to the orientation of parts or features. It should be understood, however, that the terms are used only for purposes of description, and are not intended to be used as limitations. Accordingly, orientation of an object or a combination of objects may change without departing from the scope of the invention.

With reference to the Figures, a thread repair system 10 (system 10) is presented. The thread repair system 10 includes a thread repair insert 12, a slug 14, a socket 16, and a cap screw 18 that are used in concert with one another to repair worn or damaged threads in a threaded opening in parent material.

Thread Repair Insert: Thread repair insert 12 is formed of any suitable size, shape and design and serves to repair worn or damaged threads in parent material. With reference to FIGS. 1-9, in one arrangement, as is shown, as one example, thread repair insert 12 is formed of a cylindrical body 20 that extends a length from an upper end 22 to a lower end 24. The thread repair insert 12 has an exterior surface 26 that includes threads 27 and a hollow interior 28 with an interior surface 30 that is also threaded. Cylindrical body 20 is generally cylindrical in shape and extends a length between upper end 22 and lower end 24 with an axis of rotation 31 that extends approximately through the center of the hollow interior 28 of thread repair insert 12.

The upper end 22 of thread repair insert 12 terminates in a generally flat surface that extends in approximate perpendicular alignment to the length of thread repair insert 12 and extends in approximate perpendicular alignment to the axis of rotation 31 of thread repair insert 12. Similarly, the lower end 24 of thread repair insert 12 terminates in a generally flat surface that extends in approximate perpendicular alignment to the length of thread repair insert 12 and extends in approximate perpendicular alignment to the axis of rotation 31 of thread repair insert 12. In this way, the generally flat surface of the upper end 22 and the generally flat surface of 30 the lower end of thread repair insert 12 extend in approximate parallel spaced alignment to one another.

The lower end 24 of thread repair insert 12 includes a cutting section 32 that is formed of a plurality of notches 34 that separate a plurality of threaded sections 36. In the arrangement shown, as one example, five notches 34 separate five threaded sections 36. However, any number of notches 34 and threaded sections 36 are hereby contemplated for use such as one, two, three, four, six, seven, eight, nine, ten, eleven, twelve, thirteen, fourteen, fifteen, sixteen, seventeen, eighteen, nineteen, twenty or more depending on the size of the thread repair insert 12 and the needs of the application.

Notches 34 are formed of any suitable size shape and design and as notches 34 separate threaded sections 36, threaded sections 36 are formed of any suitable size shape and design. Or, said another way, threaded sections are formed of any suitable size, shape and design and as threaded sections 36 separate notches 34, notches are formed of any suitable size, shape and design. In one arrangement, notches 34 have a generally flat and planar outwardly facing exterior surface 38. The planar surface formed by exterior surface 38 of notches 34 extends vertically in approximate parallel spaced alignment to the axis of rotation 31 of thread repair insert 12 and the height of thread repair insert 34.

Notches 34 extend vertically between an upper edge 40 and a lower edge 42. As one example, in the arrangement shown, lower edge 42 is generally flat and terminates at and in alignment with lower end 24 of thread repair insert 12. In this arrangement, lower edge 42 of notches 34 extend in approximate perpendicular alignment to the axis of rotation 31. As one example, in the arrangement shown, upper edge 40 is also generally flat and extends in approximate perpendicular alignment to the axis of rotation 31 of thread repair insert 12, and extends in approximate parallel spaced alignment with upper end 22 and lower end 24 of thread repair insert 12. As such, in this example, upper edge 40 and lower edge 42 of notch 34 extend in approximate parallel spaced relation to one another. In this arrangement, cutting section 32 extends between the lower end 24 of thread repair insert 12 and lower edge 42 of notches 34 to the upper edge 40 of notches 34. In this arrangement, as the upper edge 40 of the notches 34 is approximately level or horizontal, or perpendicular with respect to the axis of rotation 31, and the height of thread repair insert 12. The threads 27 in the exterior surface 26 of thread repair insert 12 are positioned at a slight angle to the axis of rotation 31. As such, depending on the position of the notches 34 around the circumference of thread repair insert 12, the upper edge 40 of notches 34 may engage and intersect with a partial portion of a thread 27.

Figure 17:
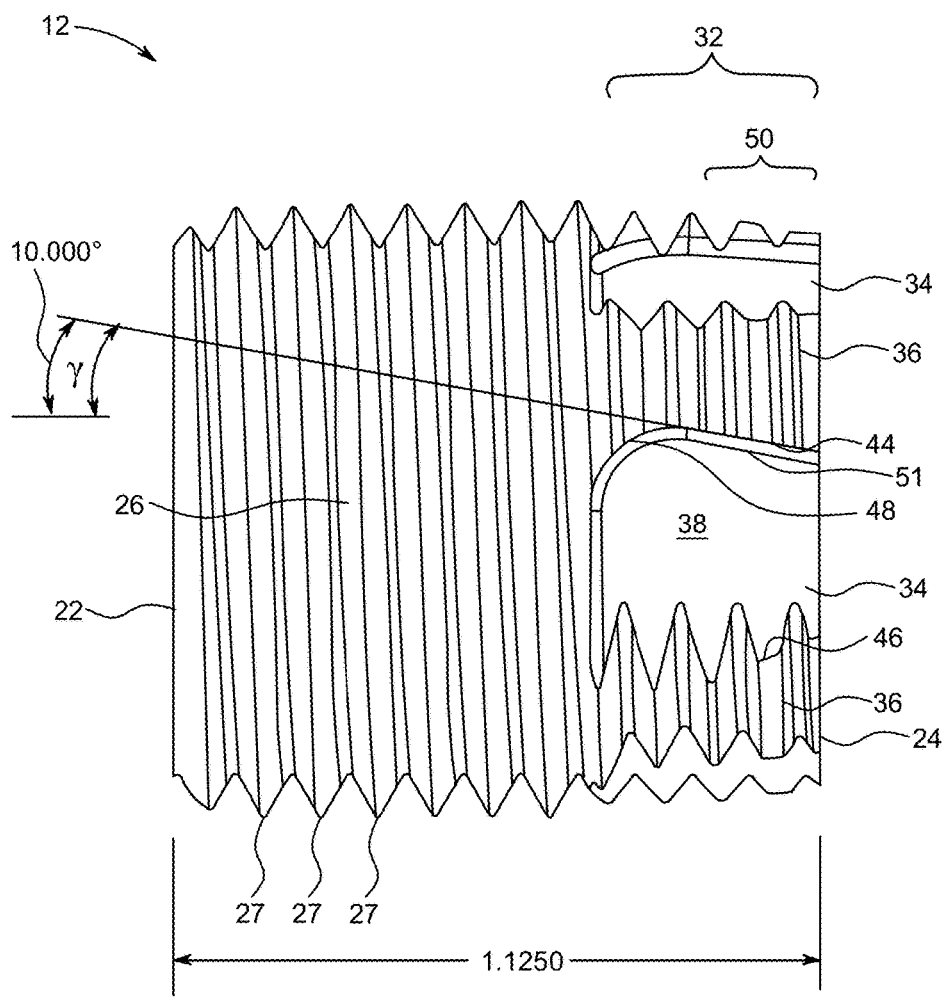
FIG. 17 is a cross-sectional view of the thread repair insert as described herein, the view showing measurements and angles contained within the thread repair insert.
Figure 18:
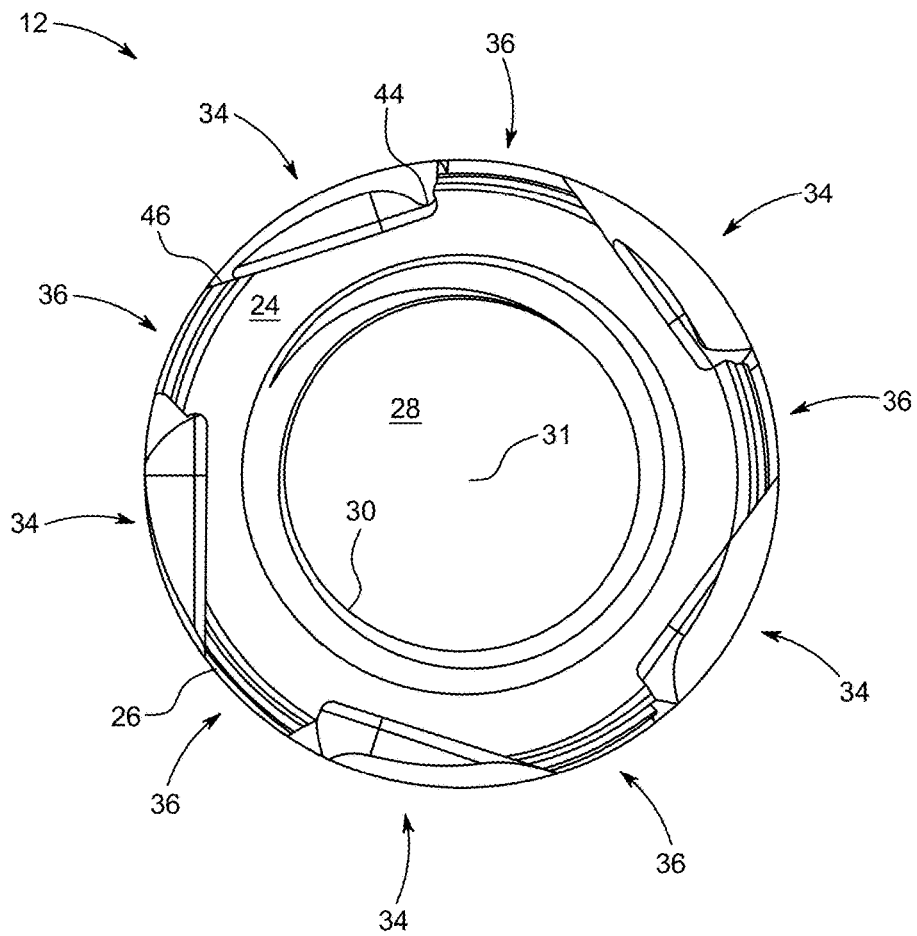
FIG. 18 is a perspective view of the lower end of the thread repair insert.
Figure 19:
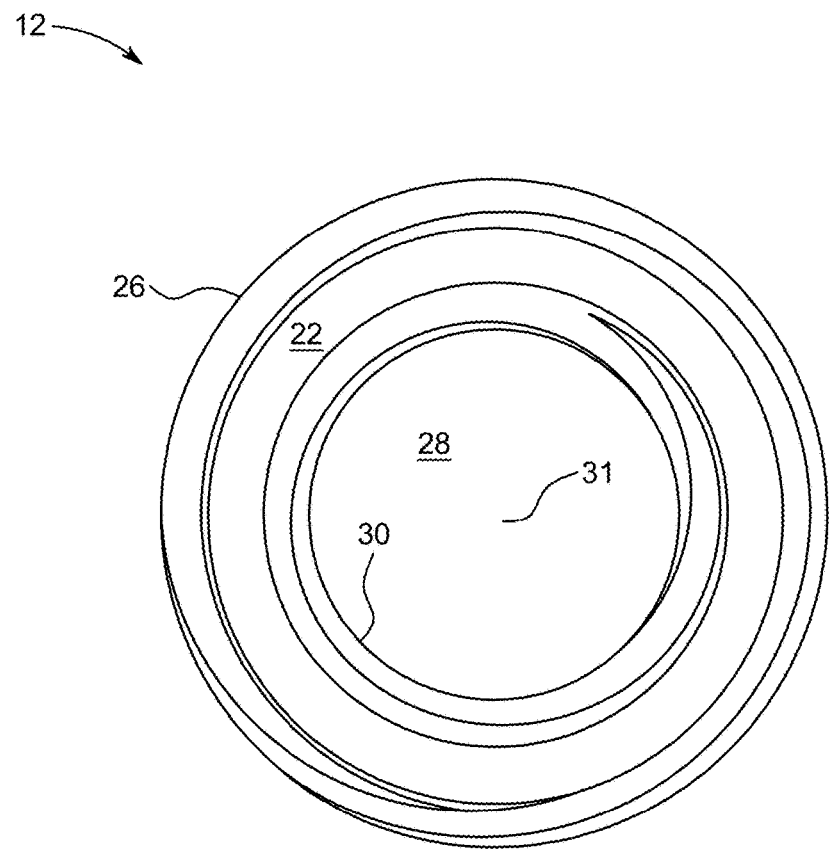
FIG. 19 is a perspective view of the upper end of the thread repair insert.

Notches 34 extend laterally between a cutting edge 44 and a trailing edge 46. As one example, in the arrangement shown, cutting edge 44 is generally flat and straight and extends at an angle γ to the axis of rotation 31 (as is shown in FIG. 17). That is, in the arrangement shown, the lower end of cutting edge 44 is positioned forward, in the direction of rotation, of the upper end of cutting edge 44, in the direction of rotation. In one arrangement, as one example, cutting edge 44 is positioned at approximately a 10° angle to the axis of rotation 31. However, any other angle is hereby contemplated for use such as 1° to 30°, or more. Specifically the following ranges are contemplated for use: 9° to 11°, 8° to 12°, 7° to 14°, 6° to 15°, 5° to 16°, 4° to 17°, 3° to 18°, 2° to 19°, and 1° to 20°. In an alternative arrangement, cutting edge 44 extends vertically, or said another way at a perpendicular alignment the flat surfaces of the upper end 22 and lower end 24 of the thread repair insert 12. In yet another alternative arrangement, the lower end of cutting edge 44 is positioned rearward, in the direction of rotation, of the upper end of cutting edge 44, in the direction of rotation.

The upper end of cutting edge 44 connects to upper edge 40 at corner section 48. In one arrangement, corner section 48 is arcuate or curved. That is, in the arrangement shown, the upper end of cutting edge 44 smoothly curves the generally straight cutting edge 44 into upper edge 40 thereby avoiding a sharp corner section (such as a "7" shape if the smooth transition created by corner section 48 was not present). This smooth transition helps to smoothly move parent material from the cutting face of cutting edge 44 into the upper thread portions of the threaded sections 36 as the thread repair insert 12 is tightened into the parent material. In an alternative arrangement, the corner section 48 is not present and the generally straight cutting edge 44 intersects with the generally straight upper edge 40, thereby forming a "7" shape (when the lower end of cutting edge 44 is positioned forward of the upper end of cutting edge 44; or in the arrangement where the cutting edge 44 extends vertically and the upper edge 40 is horizontal, the intersection of the generally straight cutting edge 44 with the generally straight upper edge 40 forms a 90° corner. Any other shape or form of intersection is hereby contemplated at the corner section 48.

Figure 16:
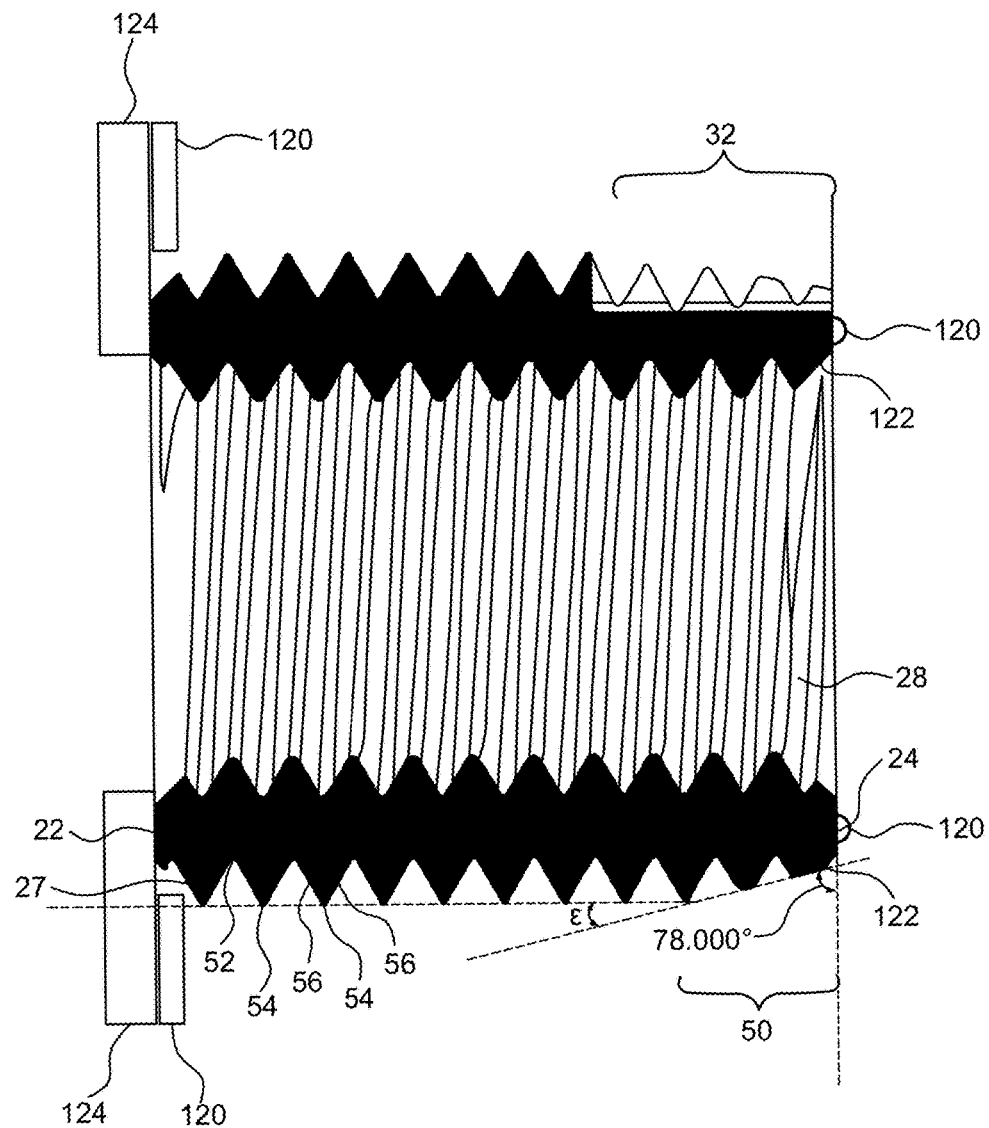
FIG. 16 is a cross-sectional view of the thread repair insert.

With reference to FIG. 16, and as is shown in FIGS. 1-9, the lower end 24 of thread repair insert 12 includes a tapered section 50. That is, the lower end 24 of thread repair insert 12 narrows in diameter as it extends downward in the tapered section 50. In one arrangement, as is shown as one example, the lower end of thread repair insert 12 narrows at a generally straight angle E. In one arrangement, the tapered section 50 narrows at an approximately 12° angle to the exterior surface 26 of thread repair insert 12. That is, when viewed from the side, the lower end 24 narrows at a straight or approximately straight angle. However any other angle is hereby contemplated for use, such as angles between 1° and 30°. Specifically the following ranges are contemplated for use: 11° to 13°, 10° to 14°, 9° to 15°, 8° to 16°, 7° to 17°, 6° to 18°, 5° to 19°, 4° to 20°, 3° to 21°, 2° to 22°, and 1° to 23°. In an alternative arrangement, instead of angling in a straight manner to the exterior surface 26 of thread repair insert 12, the lower end 24 of thread repair insert 12 narrows in curved or arcuate fashion. That is, when viewed from the side, the lower end 24 narrows in a curved or arcuate fashion, such as having a concave curve or convex curve instead of narrowing in straight angled fashion.

In one arrangement, tapered section 50 extends from the lower end 24 of thread repair insert 12 upward before terminating when the angle or surface of the tapered section 50 no longer intersects with the exterior surface 26 of thread repair insert 12. In one arrangement, as is shown, as one example, the tapered section 50 terminates between the upper edge 40 and lower edge 42 of notches 34. Or, said another way, the upper edge of tapered section 50 terminates within cutting section 32. In one arrangement, as one example, the upper edge of tapered section 50 terminates between one third to two thirds of the way up cutting section 32 and/or notches 34.

As one example, the upper edge of tapered section 50 terminates at approximately midway point or half of the way up cutting section 32 and/or notches 34. With reference to FIG. 16, and as is shown in FIGS. 1-9, threads 27 are formed of any suitable size, shape and design. In one arrangement, as is shown, threads extend from a trough, or thread root 52 to a peak 54 which is defined by a pair of opposing sides 56 which angle in toward one another to form peak 54 and angle away from one another towards opposing thread roots 52. When viewed from the side, sides 56 of thread 27 are generally flat and planar and intersect with one another to form a generally sharp or pointed peak 54 that is formed by the intersection of two flat planes. In contrast to the sharp or pointed nature of peaks 54, thread root 52 is generally smooth or rounded. That is, when viewed from the side, thread roots 52 have a rounded, curved, arcuate, semi-circular, or partial portion of a circle shape that smoothly transitions the inward end of one side 56 of one thread 27 to the inward end of the adjacent side 56 of the adjacent thread 27. This rounded, curved, arcuate, semi-circular, or partial portion of a circle shape may be referred to as a root-radius in the industry. This rounded, curved, arcuate, semi-circular, or partial portion of a circle shape or root-radius helps to reduce crack forming in the thread repair insert 12 and add strength to the thread repair insert 12 as well as to facilitate thread forming in the notches 34 and threaded sections 36 as is further described herein. In the arrangement shown, the thread roots 52 are formed of a partial portion of a circle that curves in a generally partially circular fashion from the inward end of one side 56 to the inward end of the adjacent side 56. In an alternative arrangement, peaks 54 are rounded, curved, arcuate, semicircular, or formed of a partial portion of a circle like thread roots 52. In an alternative arrangement, thread roots 52 are formed of a generally sharp or pointed recess that is formed by the intersection of the generally flat planes of the inward ends of adjacent sides 56 of adjacent threads 27.

As is visible in FIGS. 1, 2, and 5-7, in the arrangement shown, as one example, the exterior surface 38 of notches 34 are positioned at an offset angle with respect to the center of thread repair insert 12 and axis of rotation 31. That is, while the exterior surface 38 of notches 34 extends vertically with respect to the center of thread repair insert 12 and axis of rotation 31, the cutting edge 44 extends a depth into the material of the thread repair insert 12 whereas the railing edge 46 exits the exterior surface 26 of thread repair insert 12. This arrangement causes an outward step at cutting edge 44.

In one arrangement, the depth of notches 34 at cutting edge 44 is constant with respect to the exterior surface 26 of thread repair insert. However, due to the narrowing diameter of the lower end 24 of thread repair insert 12 due to the tapered section 50, the relative depth or step height of cutting edge 44 narrows as it extends downward into tapered section 50.

In one arrangement, as is shown, the depth of notch 34 at cutting edge 44 is greater than the maximum depth of tapered section 50. That is, in this arrangement, the cutting edge 44 continues to be visible, and there continues to be an outward step, even at the lower end 24 of thread repair insert 12. In an alternative arrangement, the tapered section 50 is deeper than cutting edge 44 at lower end 24 of the thread repair insert 12 thereby eliminating the lower end of cutting edge 44 until the depth of cutting edge 44 is greater than, and intersects with, the depth of tapered section 50.

In one arrangement, as is shown, the depth of thread roots 52 of threads 27 remains constant or generally constant with respect to the exterior surface of thread repair insert 12 from the upper end 22 to the lower end 24 of thread repair insert 12. In one arrangement, as is shown, the depth of notches 34 at cutting edge 44 is deeper than thread roots 52 of threads 27. As such, in this arrangement, the outward step of cutting edge 44 occurs at all thread roots 52.

In one arrangement, while the depth of notches 34 at cutting edge 44 is deeper than thread roots 52 of threads 27, the lower end of tapered section 50 cuts into the material of deeper than thread roots 52. That is, as the tapered section 50 extends downward, more and more of the threads 27 are cut off, until even the thread root 52 of threads 27 have been consumed by the lower, and deepest, end of tapered section 50; however, in the arrangement shown, even at this point, the cutting edge 44 remains. That is, in the arrangement shown, the deepest portion of the tapered section 50 terminates deeper than the thread roots 52 of threads 27, but shallower than the outward step of cutting edge 44. Said another way, the deepest portion of the tapered section 50 terminates between the depths of the cutting edge 44 and the thread roots 44 of threads 27 at the lower end 24 of thread repair insert.

Figure 13:
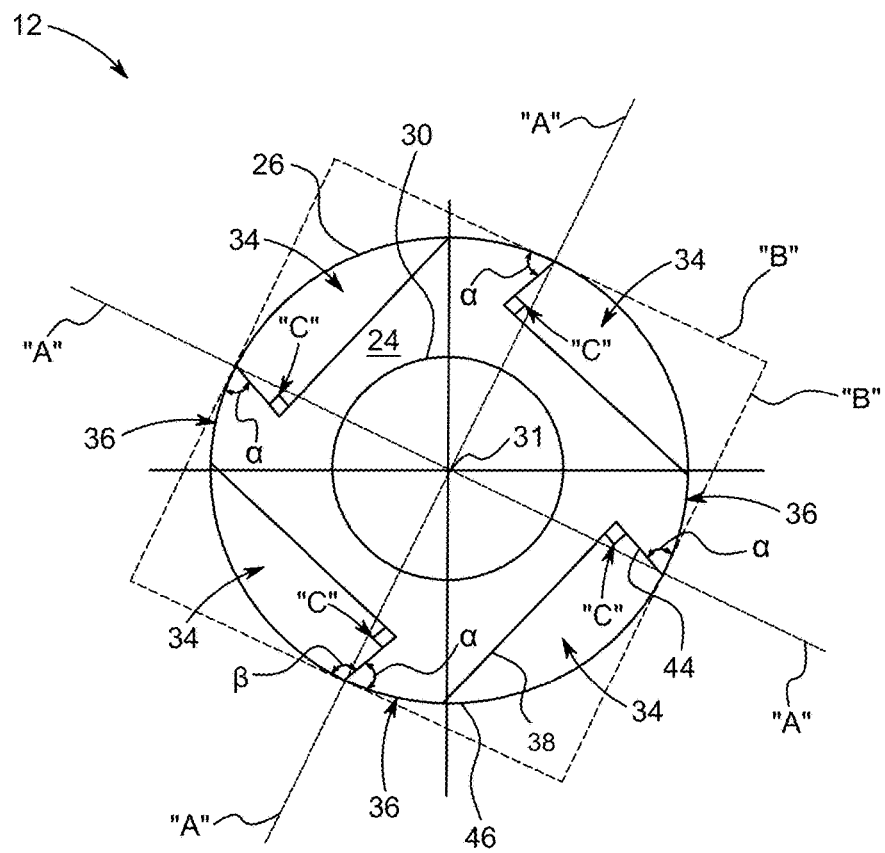
FIG. 13 is a cross-sectional view of the thread repair insert.
Figure 14:
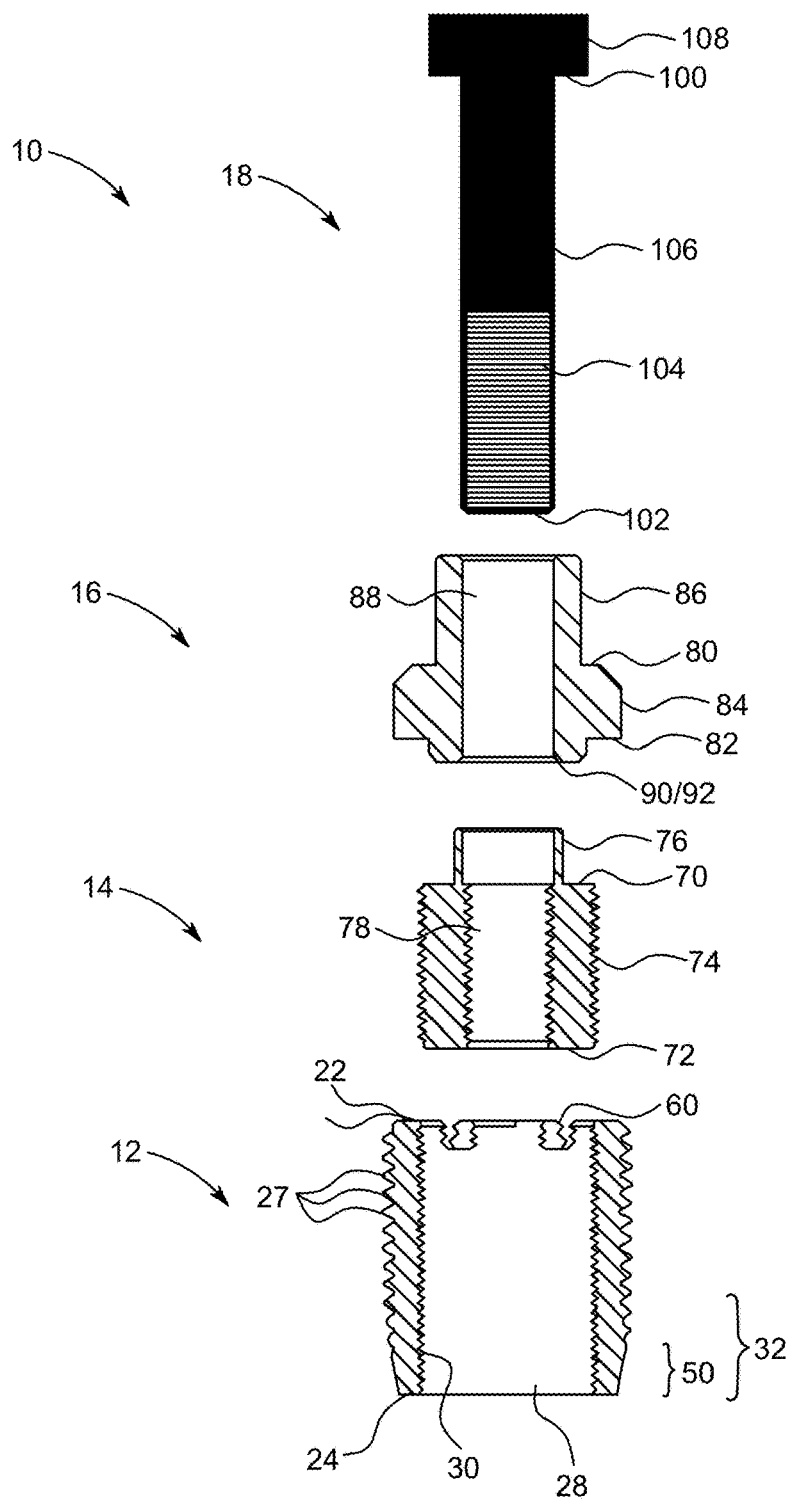
FIG. 14 is a side view of one embodiment of the thread repair system as described herein including the cap screw, the socket, the slug, and the thread repair insert.
Figure 15:
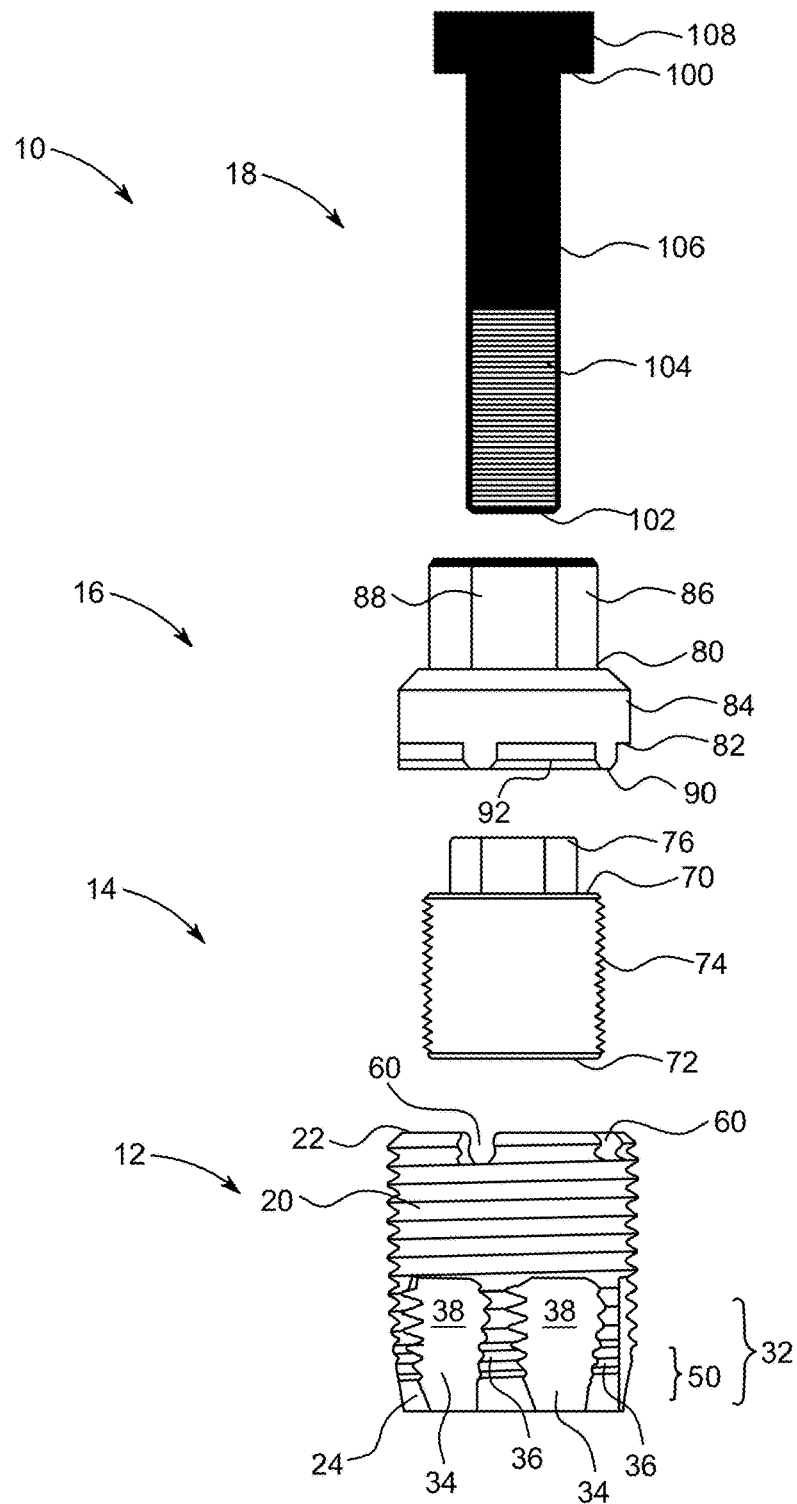
FIG. 15 is a side view of one embodiment of the thread repair system as described herein including the cap screw, the socket, the slug, and the thread repair insert.

With reference to the demonstrative FIG. 13, and as is visible in FIGS. 1, 2, and 5-9, as stated previously, the exterior surface 38 of notches 34 is generally planar in shape. In one arrangement, as is shown, the plane of the cutting edge 44 is generally perpendicular to the plane of the exterior surface 38 of notches 34. That is, in this demonstrative arrangement shown in FIG. 13, the cutting edge 44 rises generally perpendicularly out of the plane of the exterior surface 38, which is represented as "C" in this figure.

In one arrangement, as is shown in in demonstrative FIG. 13, exterior surface 38 and cutting edge 44 of notches 34 connect to one another at a generally sharp and square perpendicular intersection that is at a generally square corner when viewed from the lower end 24 of thread repair insert 12, as is represented by "C" in FIG. 13. While using a sharp and square intersection is effective, in an alternative arrangement this sharp corner, or 90° corner is replaced with a curved section 51 is used to smoothly connect the perpendicularly positioned planes of the exterior surface 38 and cutting edge 44. Curved section 51 is any form of a curved, arcuate, semi-circular or smooth transition that smoothly connects the perpendicularly positioned planes of exterior surface 38 and cutting edge 44. In one arrangement, as is shown, curved section 51 is formed of approximately 90° of a circular shape. This curved section 51 helps smoothly transition chips formed by the cutting edge 44 during the cutting process as is further described herein. In contrast to the smooth transition presented by curved section 51, the intersection between exterior surface 26 and cutting edge 44 is sharp or pointed and formed by an acute angle between cutting edge 44 and exterior surface 26 as is also further described herein.

Despite the cutting edge 44 being perpendicularly oriented to the exterior surface 38, in one arrangement, the cutting edge 44 is not perpendicularly oriented to the exterior surface of thread repair insert 12. That is, due to the cutting edge 44 being deeper into the material of the thread repair insert 12 (whereas the trailing edge 46 exits the material of the thread repair insert 12) there is a "point" or "hook" or sharp edge that at the cutting edge 44. Or said another way, the plane of cutting edge 44 intersects the exterior surface 26 of thread repair insert 12 at an acute angle a (an angle less than a right angle, an angle less than 90°).

With reference to the demonstrative FIG. 13, as one example, a bottom view of a thread repair insert 12 is shown, the thread repair insert 12 having exterior surface 26 and hollow interior 28 having an interior surface 30. In this example, the thread repair insert 12 includes four notches 34. The exterior surface 38 of notches 34 extend generally perpendicularly to the face of cutting edges 44. However, because exterior surface 38 of notches 34 extends deeper into the material of thread repair insert 12 at the cutting edges 44, whereas the trailing edges 46 exit the surface of the thread repair insert 12, this causes the cutting edges 44 to intersect the exterior surface 26 of thread repair insert 12 at an acute angle α thereby forming the cutting edge 44 (as is shown in FIG. 13).

In the example FIG. 13, four notches 34 are shown, each having an exterior surface 38 and a cutting edge 44, wherein each exterior surface 38 and cutting edge 44 are aligned at an approximate perpendicular alignment to the adjacent exterior surfaces 38 and cutting edges 44 of adjacent notches 34. At the point where the cutting edges 44 intersect the exterior surface 26 of thread repair insert 12 a dashed line "A" is shown which extends from the axis of rotation 31 outward and which intersects the exterior surface 26 at a perpendicular alignment (a right angle, an angle of 90°). A dashed line "B" is shown which forms a square box around the thread repair insert 12; this dashed line "B" intersects the exterior surface 26 of thread repair insert 12 at four tangent points where cutting edges 44 intersect the exterior surface 26 of thread repair insert 12. The dashed line "A" intersects the dashed line "B" at a perpendicular alignment, which is also the point where the cutting edges 44 intersect the exterior surface 26 of thread repair insert 12, As cutting edge 44 intersects the exterior surface 26 of thread repair insert 12 at an acute angle α, it goes without saying that the opposite side of cutting edge 44 is positioned at an obtuse angle β to the exterior surface 26 of thread repair insert 12. This depiction helps to show the "hook" or "point" of cutting edge 44. By positioning the cutting edge 44 at an acute angle α to exterior surface 26 of thread repair insert 12 this helps to cut chips from the parent material and force this cut material along cutting edge 44 and into notch 34 towards "C".

Angle α can be any acute angle between 30° and 90°. In one arrangement, angle α has been tested with success between 60° and 90°, and more specifically between 75° and 89°. However, any other angle is hereby contemplated for use, including 90°. The combination of the two angles α and β help to form threads in the parent material. That is, because the lower end of cutting edge 44 is positioned forward, in the direction of rotation, of the upper end of cutting edge 44, this helps to force or guide the chips formed by cutting edge 44 upward into the notch 34. Similarly, because the cutting edge 44 is positioned at an acute angel to the exterior surface 26 of thread repair insert 12 this forms a hook or point that helps to force or guide the chips formed by cutting edge 44 into notch 34. As such, the combination of the two angles α and β help to form threads in the parent material by guiding the chips formed by cutting edge 44 upward and into the notches 34 and into the threaded sections 36.

With reference to FIGS. 15, 17, 18, and 27, and is also visible in FIGS. 1 and 2 and 5-9, threaded sections 36 are formed of any suitable size shape and design and serve to form threads in the parent material cut by cutting edge 44. In the arrangement shown, threaded sections 36 are positioned between the cutting edge 44 of one notch 34 and the trailing edge 46 of the adjacent notch 34. While the term "trailing edge" 46 is used herein to describe notches 34, it is understood that the trailing edge 46 actually precedes the cutting edge 44 of notches 34 and as such, the cutting edge 44 is the leading edge of threaded sections 36, whereas the trailing edge 46 is the trailing edge of threaded sections 36, in the direction of rotation.

Threaded sections 36 include a plurality of threads 27. In the arrangement shown, seven threads are shown as part of the threaded sections 36. However, any number of threads 27 is hereby contemplated for use in the threaded section 36 from one to over 100. In the arrangement shown, with reference to demonstrative FIG. 27, threaded section includes one or more full threads 27a, which are positioned at the upper end of the cutting section 32 above the tapered section 50, and a plurality of partial threads 27b, which are positioned towards the lower end of cutting section 32 and within the tapered section 50.

Above the tapered section 50, the threads are uninterrupted or un-cut by the tapering of the tapered section 50 and as such these are full threads 27a and include a peak 54 or sharp point. Within the tapered section 50, the peak has been truncated, in one arrangement by a milling, grinding, sanding, cutting or another removal process, leaving a flat face 58 positioned at the angle of the cut of the tapered section 50. Due to the tapered section 50 extending at angle α, the further down in the tapered section 50 the greater the amount of material has been removed and therefore the height of the partial thread 27b gets smaller and smaller, and the face 58 gets larger and larger, until even the thread root 52 of the lower threads 27 are consumed and no portion of the thread remains and the angled plane of the tapered section 50 exits the lower end 24 of the thread repair insert 12.

As stated above, in one arrangement, the angle of the tapered section 50 is positioned such that it exits the lower end 24 of thread repair insert 12 at a depth that is greater than the thread roots 52 of threads 27 but shallower than the depth of notches 34 at the cutting edges 44. This arrangement leaves a portion of the cutting edge 44 visible at the lower end 24 of thread repair insert 12 while all thread roots 52 have been removed.

When viewed from the side, with reference to FIGS. 20-23, threaded sections 36 are wider at their lower end and narrow as they extend upward until they reach the corner section 48 at which point they again begin to widen again. The threaded sections 36 terminate at the upper edge 40 of the notches 34 above which the continuous threads 27 of the exterior surface 26 continue upward until they terminate at the upper end 22 of the thread repair insert 12.

Figure 20:
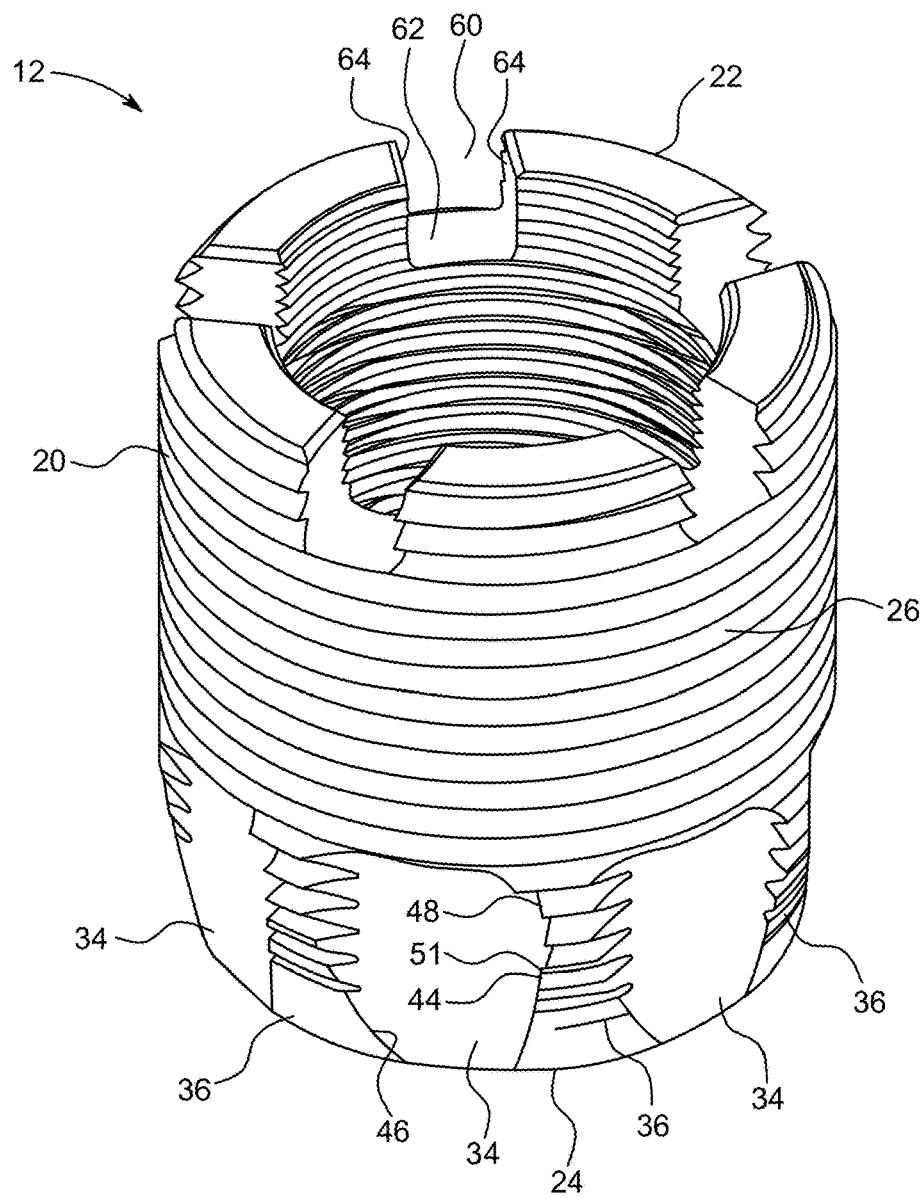
FIG. 20 is a perspective view of the thread repair insert from the upper end.
Figure 21:
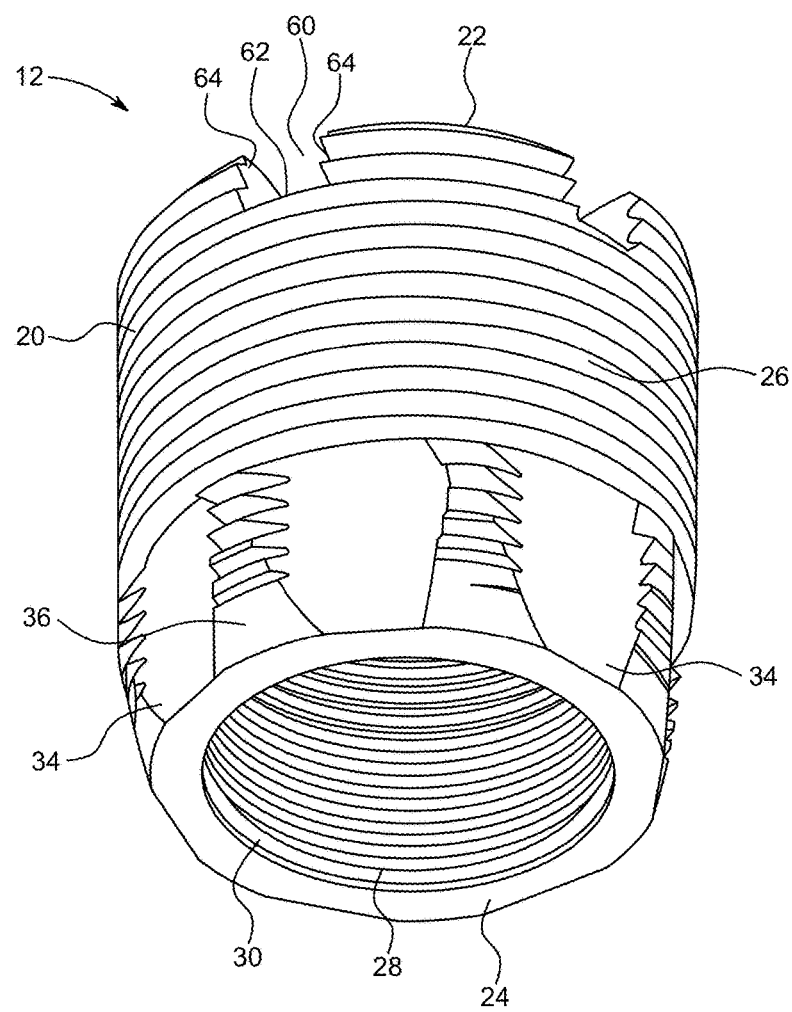
FIG. 21 is a perspective view of the thread repair insert from the lower end.
Figure 22:
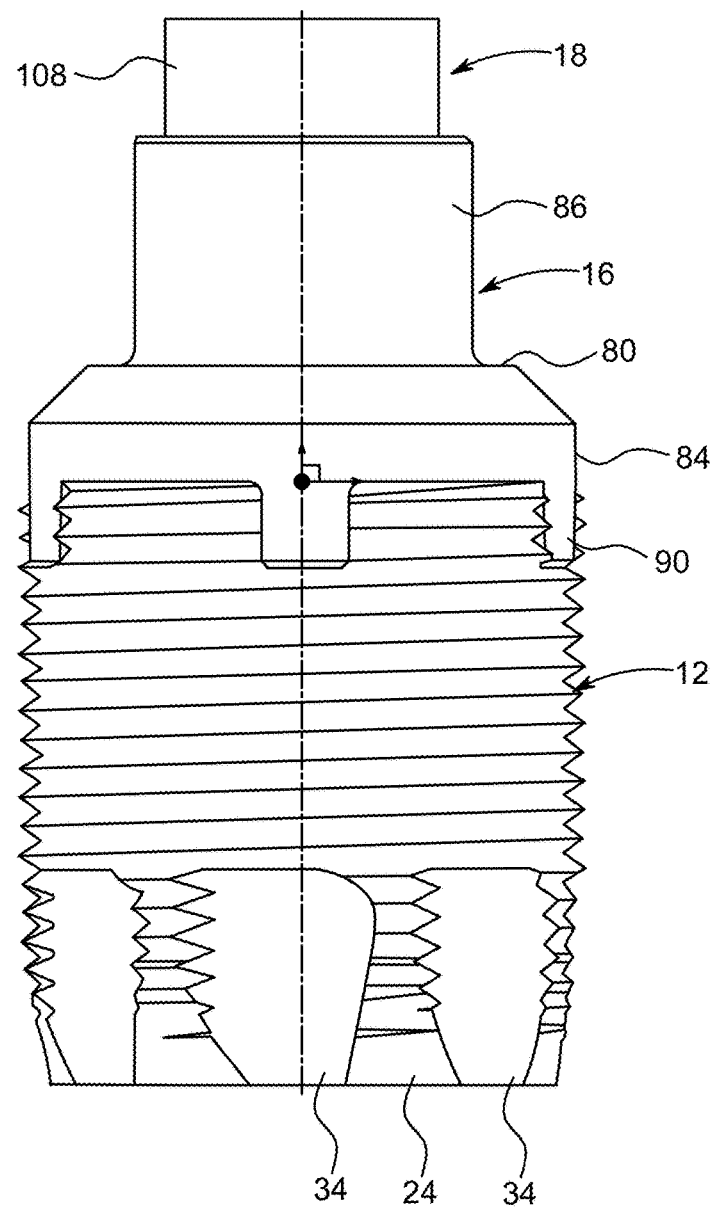
FIG. 22 is a side perspective view of the cap screw, the socket, and the thread repair insert.
Figure 23:
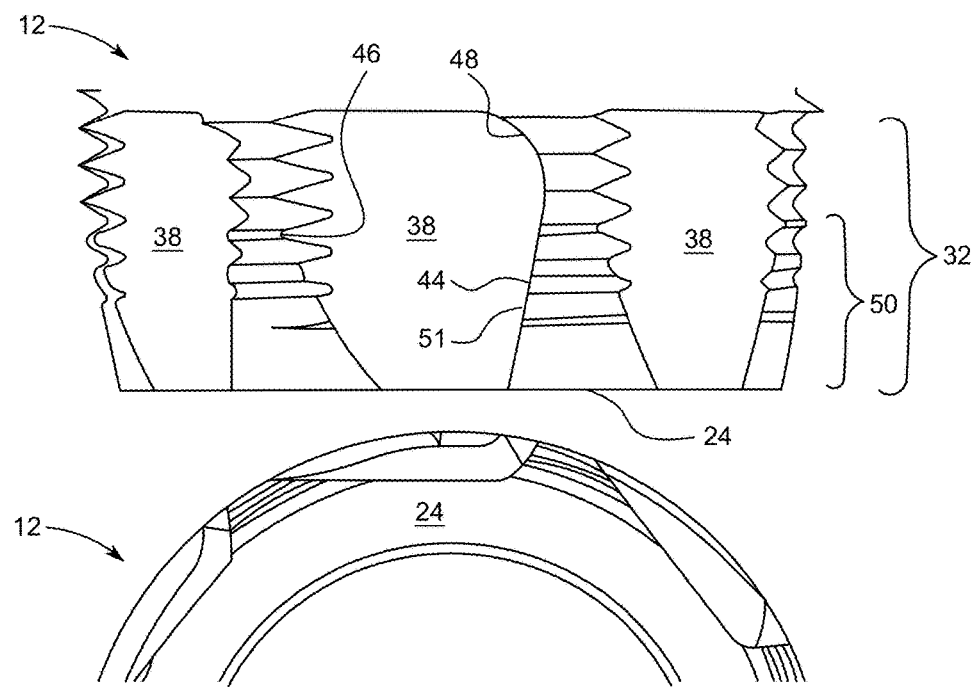
FIG. 23 is a cross-sectional view of the thread repair insert from the lower end.
Figure 24:
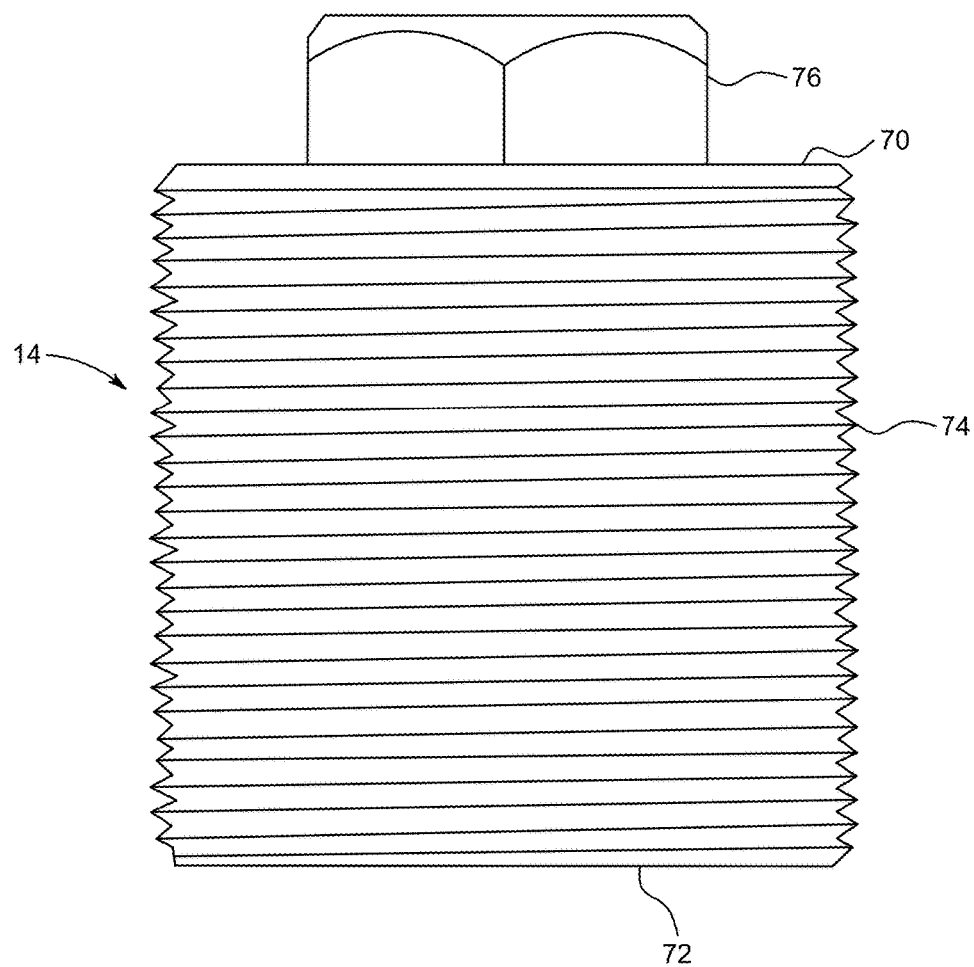
FIG. 24 is a side perspective view of the slug.
Figure 25:
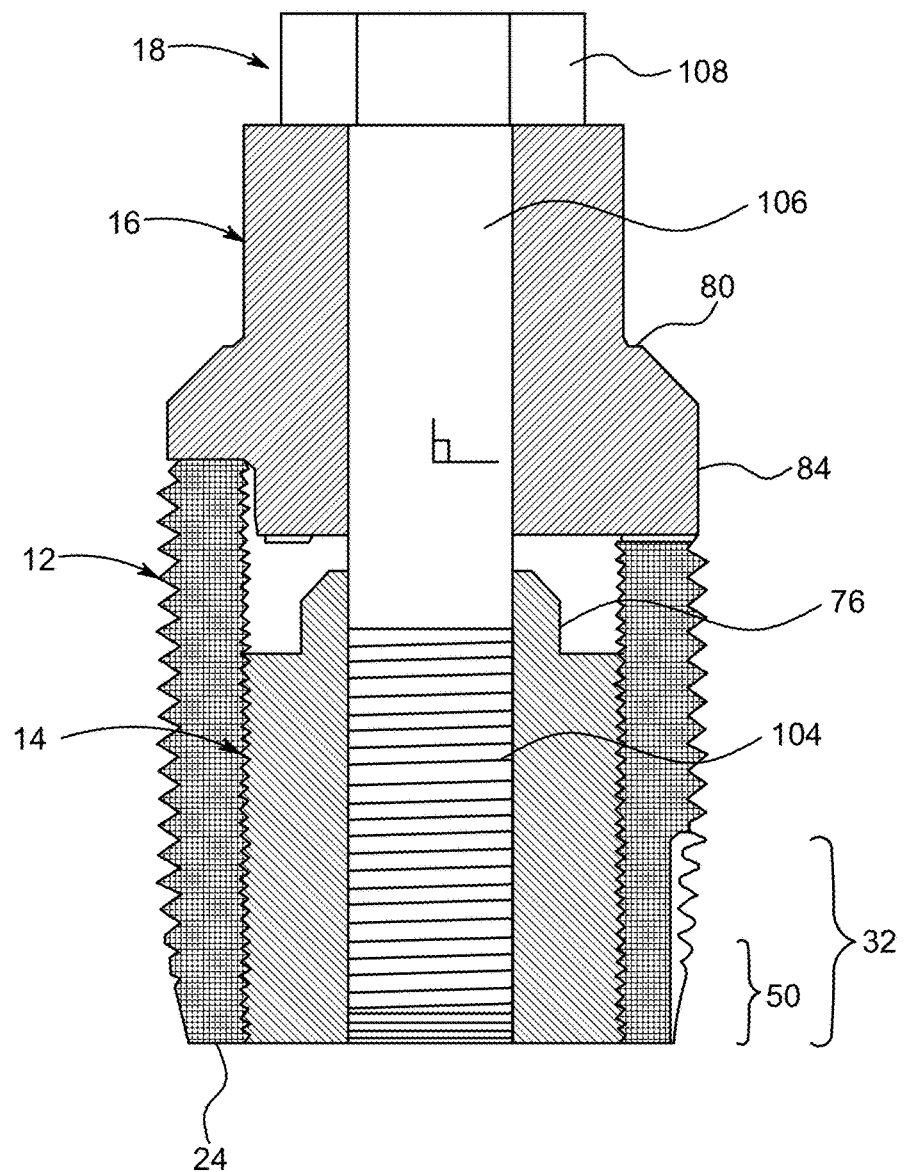
FIG. 25 is a side perspective view of the cap screw, the socket, the thread repair insert, and the slug.
Figure 26:
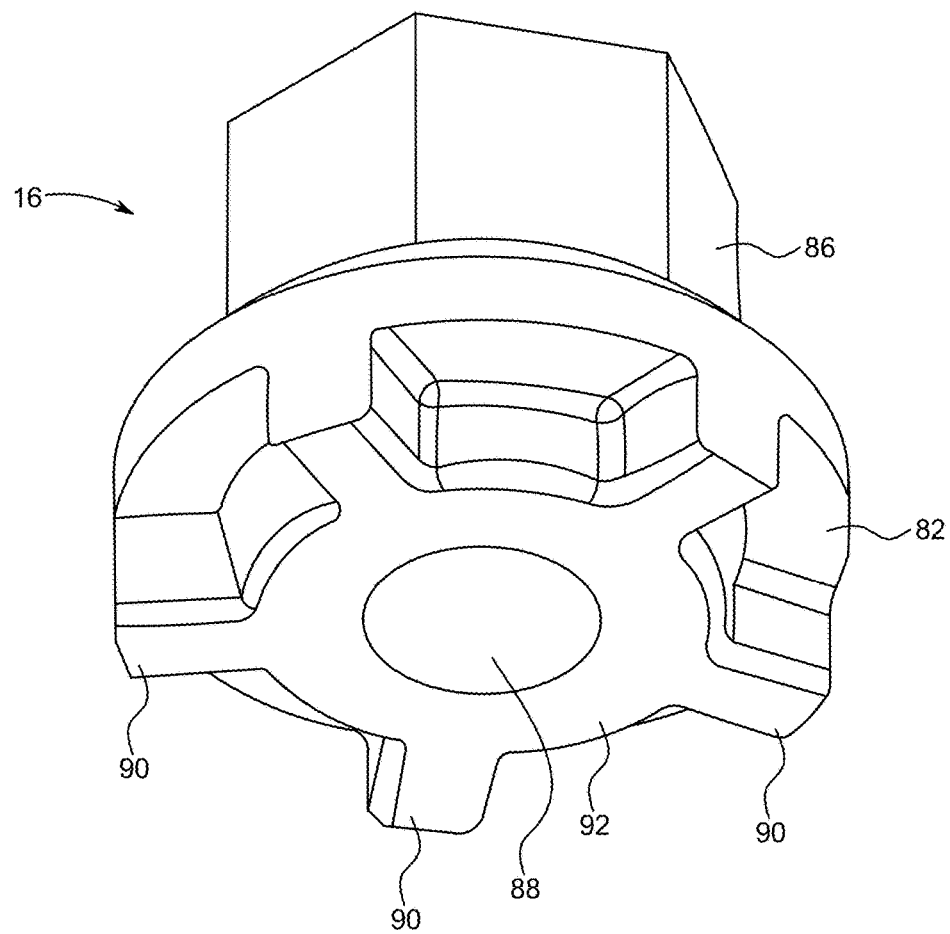
FIG. 26 is a perspective view of the socket from the lower end.
Figure 27:
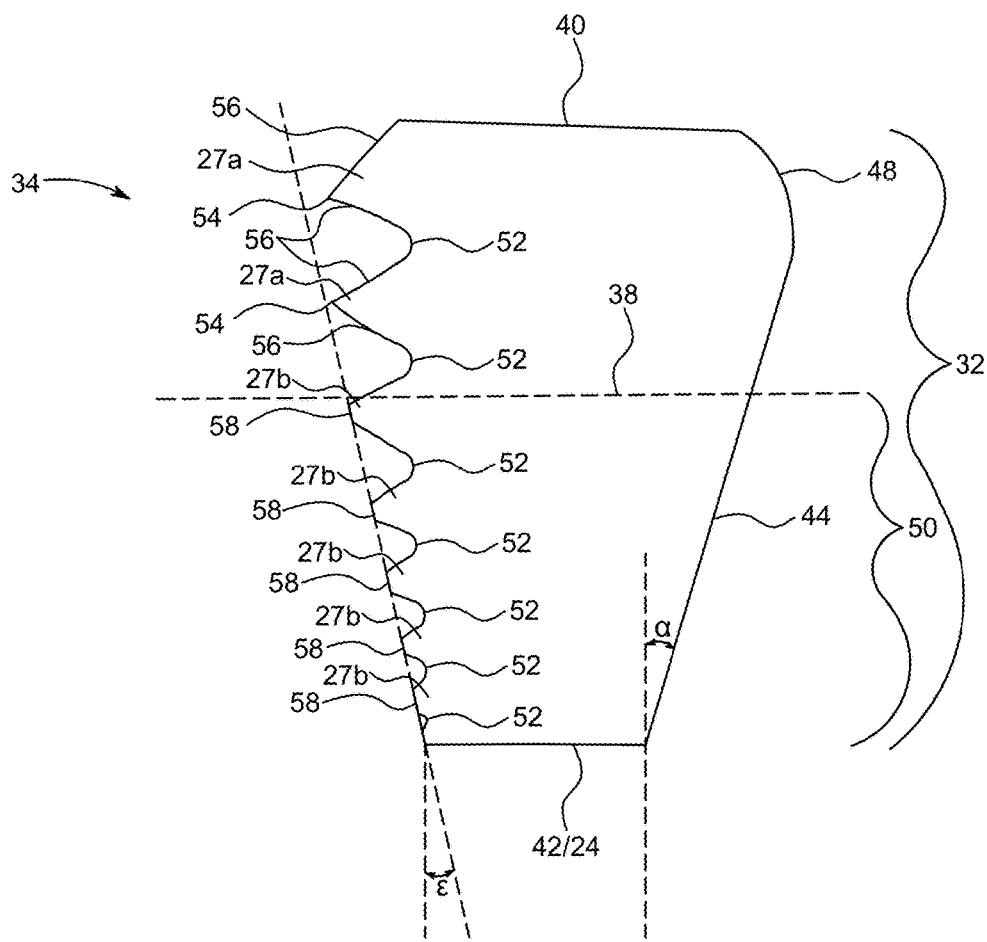
FIG. 27 is a cross-sectional view of the notches, the view showing angles contained within the notches.

With reference to FIGS. 20 and 21, and as is visible in FIGS. 1-3 and 5-9, in one arrangement, the upper end 22 of thread repair insert 12 includes one or more recesses 60 which are used to help transmit torque to the thread repair insert 12 during the installation process. Recesses 60, when present, are formed of any suitable size, shape and design. In the arrangement shown, recesses 60, when viewed from the side, are generally square or rectangular in shape and extend downward from the upper end 22 of thread repair insert. In this arrangement, the bottom wall 62 of recesses 60 extends in approximate parallel spaced alignment to the upper end 22 of thread repair insert 12, and the sidewalls 64 of recesses 60 extends in approximate perpendicular alignment to the upper end 22 of thread repair insert 12. In the arrangement shown, five recesses 60 are present, which are equally spaced from one. However, any number of recesses 60 are hereby contemplated for use, such as one, two, three, four, six, seven, eight, nine, ten or more.

Slug: With reference to FIGS. 12, 14, 15, 24 and 25, slug 14 is formed of any suitable size, shape and design and serves to be threadably inserted within the hollow interior 28 of thread repair insert 12. In the arrangement shown, as one example, slug 14 includes a generally cylindrical body that extends a length between an upper end 70 and a lower end 72 and includes a threaded exterior surface 74. The exterior diameter and the threads in the exterior surface 74 of slug 14 are sized and shaped to threadably engage the threads 27 in the interior surface 30 of thread repair insert 12.

A rotation mechanism 76 is connected to the upper end 70 of slug 14. Rotation mechanism 76 is any feature that assists with the application of rotational force to slug 14. In one arrangement, as is shown, rotation mechanism 76 is a six-sided hexagonal nut-shaped feature that extends upward a distance from the upper end 70 of slug 14. In this arrangement, the rotation mechanism 76 is sized and shaped to be received within a conventional socket for quick and easy installation and removal.

Slug 14 includes a hollow interior 78 with an interior surface that includes threads 27 therein. This hollow interior 78 with its corresponding threads 27 allows for the insertion and threaded engagement of a lower end of the cap screw 18 therein as is further described herein.

Socket: With reference to FIGS. 10, 11, 14, 15, 22, 25 and 26, socket 16 is formed of any suitable size, shape and design and serves to be engage the upper end 22 of thread repair insert 12 and to impart rotational force onto thread repair insert 12 during the installation process. In the arrangement shown, as one example, socket 16 includes a generally cylindrical body that extends a length between an upper end 80 and a lower end 82 and includes a generally smooth exterior surface 84.

A rotation mechanism 86 is connected to the upper end 80 of socket 16. Rotation mechanism 86 is any feature that assists with the application of rotational force to socket 16. In one arrangement, as is shown, rotation mechanism 86 is a six-sided hexagonal nut-shaped feature that extends upward a distance from the upper end 80 of socket 16. In this arrangement, the rotation mechanism 86 is sized and shaped to be received within a conventional socket or wrench for quick and easy installation and removal.

Socket 16 includes a hollow interior 88 with an interior surface that is generally smooth and non-threaded. This hollow interior 88 allows for the insertion and passage of a lower end of the cap screw 18 therein as is further described herein so as to allow the lower end of cap screw 18 to threadably engage the hollow interior 78 of slug 14.

The lower end 82 of socket 16 includes one or more protrusions 90 that extend downward therefrom. Protrusions 90 are formed of any suitable size, shape and design, and are sized and shaped to engage the recesses 60 in the upper end 22 of thread repair insert 12 when present.

In the arrangement shown, as one example, when five generally square or rectangular recesses 60 are positioned in the upper end 22 of thread repair insert 12, five generally square or rectangular recesses 60 are positioned in the lower end 82 of socket 16. In this arrangement, the protrusions 90 of socket 16 are matingly received within the recesses 60 in the thread repair insert 12 when socket 16 is placed on top of thread repair insert 12.

The inward ends of protrusions 90 connect to a generally cylindrical collar 92. Protrusions 90 and collar 92 extend downward from lower end 82 of socket 16 approximately the same distance. The exterior diameter of collar 92 is sixed and shaped to fit within the hollow interior 28 of thread repair insert 12 so as to not interfere with the thread repair insert 12. Connecting protrusions 90 to collar 92 provides additional strength and rigidity to protrusions 90 and enables greater application of force to thread repair insert 12.

Cap Screw: With reference to FIGS. 14, 15, 22 and 25, cap screw 18 is formed of any suitable size, shape and design and serves to be inserted through the hollow interior 88 of socket 16 and to be threadably inserted within the hollow interior 78 of slug 14 when slug 14 is threadably engaged within the hollow interior 28 of thread repair insert 12. In the arrangement shown, as one example, cap screw 18 includes a generally elongated cylindrical body that extends a length between an upper end 100 and a lower end 102 and includes an exterior surface that has a threaded portion 104, positioned at the lower end 102, and a non-threaded portion 106, positioned at the upper end 100. The threads in the threaded portion 104 are sized and shaped to threadably engage the threads in the hollow interior 78 of slug 14.

A rotation mechanism 108 is connected to the upper end 100 of cap screw 18. Rotation mechanism 108 is any feature that assists with the application of rotational force to cap screw 18.

In one arrangement, as is shown, rotation mechanism 108 is a six-sided hexagonal nut-shaped feature that extends upward a distance from the upper end 100 of cap screw 18. In this arrangement, the rotation mechanism 108 is sized and shaped to be received within a conventional socket or wrench for quick and easy installation and removal.

Assembly: To assemble the thread repair system 10, a slug 14 is threadably inserted within the hollow interior 28 of the thread repair insert 12. The slug 14 is rotated into the thread repair insert 12 until the lower end 72 of slug 14 is in alignment with or positioned just above the lower end 24 of thread repair insert 12. In this position, the upper end of rotation mechanism 76 of slug 14 is positioned just below the bottom wall 62 of recesses 60 in the upper end 22 of thread repair insert 12, so as to ensure that rotation mechanism 76 does not interfere with the insertion socket 16 into thread repair insert 12.

Once the slug 14 is installed on thread repair insert 12, socket 16 is installed on top of thread repair insert 12. When recesses 60 are present in the upper end 22 of thread repair insert 12, care is taken to align the protrusions 90 in the lower end of socket 16 with the recesses 60 in the upper end of thread repair insert 12. When installed properly, the sidewalls and bottom walls of the recesses 60 and protrusions 90 should be in close and tight fitting alignment with one another. In this position, the collar 92 of socket should be positioned within the hollow interior 28 of thread repair insert 12. In this position, the lower end of collar 92 should be positioned a small distance above the upper surface of rotation mechanism 76 of slug 14.

Once the slug 14 and socket 16 are installed on thread repair insert 12, cap screw 18 is installed. The lower end 102 of cap screw 18 is inserted through the smooth bore of the hollow interior 88 of socket 16. Next, when the lower end 102 of cap screw 18 engages the hollow interior 78 of slug 14 the cap screw 18 is rotated by rotation mechanism 108 such that the threads of the treaded portion 104 of the cap screw 18 threadably engage and mesh with the threads in the interior surface of hollow interior 78 of slug 14. This rotation continues until the lower end of the head or rotation mechanism 108 of cap screw 18 engages with and is in flush alignment with the upper surface of the rotation mechanism 86 of socket 16. Once in this position, the cap screw 18 is tightened against socket 16 by the pull of the threaded engagement with slug 14. Assembling the thread repair insert 12, slug 14, socket 16 and cap screw 18 in this manner provides a single rigid component. This single rigid component provides optimum strength and rigidity. In addition, this single rigid component eases installation in over-head applications, and other awkward, difficult or complex situations.

In an alternative arrangement, no slug 14 is used and instead the threaded portion 104 of cap screw 16 engages the interior surface 30 of thread repair insert 12. In another alternative arrangement, no slug 14 and no socket 16 is used and instead the threaded portion 104 of cap screw 16 engages the interior surface 30 of thread repair insert 12.

Installation: Once the thread repair insert 12, slug 14, socket 16 and cap screw 18 have been assembled into a single rigid and solid piece, with reference to FIG. 25, the thread repair insert 12 is ready to be installed. The damaged threads in the parent material are drilled out using an appropriately sized drill bit that correlates to the size of the thread repair insert 12 thereby providing a smooth bore in the parent material.

In one arrangement, an appropriately sized drill bit is slightly smaller in diameter than the diameter of exterior surface 26 of thread repair insert 12. More specifically, in one arrangement, an appropriately sized drill bit is slightly smaller in diameter than the diameter of peaks 54 of threads 27 of the exterior surface 26 of thread repair insert 12. In one arrangement, an appropriately sized drill bit is slightly larger than the distance between opposing exterior surfaces 38 of notches 34 (or said another way the diameter of the thread repair insert 12 at notches 34) while being slightly smaller in diameter than the diameter of exterior surface 26 of thread repair insert 12. In one arrangement, an appropriately sized drill bit has a diameter that is larger than the lower end 24 of thread repair insert 12 but smaller in diameter than the diameter of peaks 54 of threads 27 of the exterior surface 26 of thread repair insert 12

Once the damaged threads are drilled out, and a smooth bore or mostly smooth more is provided in the parent material the lower end 24 of the thread repair insert 12 is placed in the opening. Care is taken to ensure the thread repair insert 12 and the axis of rotation 31 is aligned with the opening in the parent material. Once properly aligned, the thread repair insert 12 is rotated into the opening.

As the thread repair insert 12 is rotated into the opening, the lower end 24 of cutting edges 44 of notches 34 engage material in the wall of the opening in the parent material. Due to the angle of the cutting edge 44, where the lower end of cutting edge 44 is positioned forward of the upper end of cutting edge 44, this angle of the cutting edge 44 helps to pull the thread repair insert 12 into the opening in parent material. Also, due to the angle of the cutting edge 44, where the cutting edge 44 intersects the exterior surface 26 of the thread repair insert 12 at an acute angle, this helps cut into the parent material.

As the thread repair insert 12 is rotated, the lower end of cutting edge 44 cuts material from the opening in the parent material in the form of chips. This cutting prepares the opening in the parent material for the process of roll forming of threads in the parent material left behind after the cutting process. That is, the cutting by the lower end 24 of cutting edge 44 ensures that opening in parent material is properly formed and sized and free of burs or aberrations. As the thread repair insert 12 is rotated, the cutting edge 44 separates chips of material from the parent material along the pointed cutting edge 44. As chips are formed, these chips travel against the cutting edge 44 from the exterior surface of the cutting edge 44 and move inward along the face of cutting edge 44 until they strike the exterior surface 38 of notch 34. When present, these chips are guided by the curved section 51 to smoothly make the transition from the perpendicular surface of the cutting edge 44 to the perpendicular exterior surface 38 of notch 34. This transition helps the chips to curl and in some cases break away from connection with the parent material. In some cases, when the chips break away they tend to fall, with the force of gravity, out of the lower end 24/lower edge 42 of notches 34 when the thread repair insert 12 is used in a vertical installation, or alternatively they tend to accumulate within the recess of notches 34.

Figure 28:
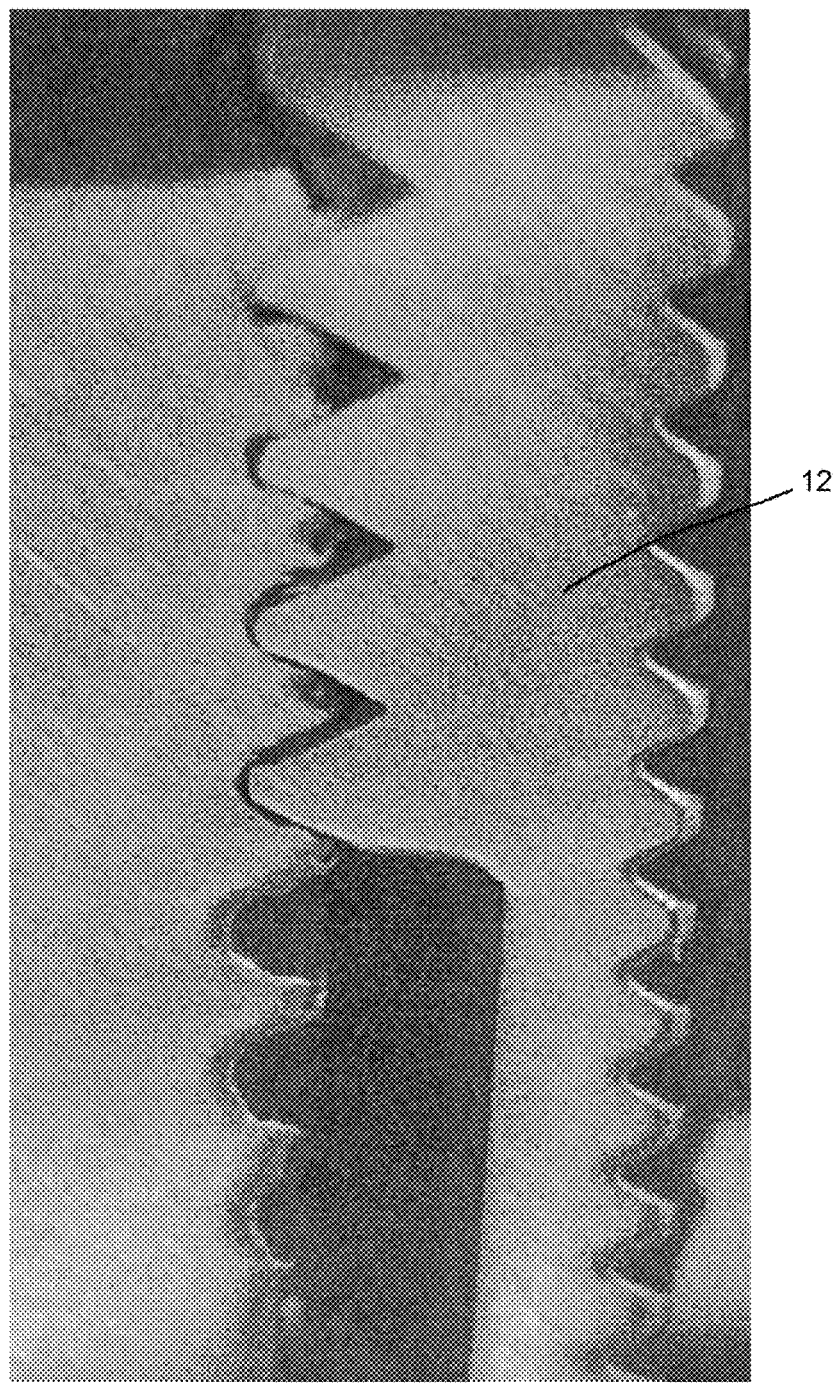
FIG. 28 is a photograph of a cross-sectional view of the thread repair insert.

As the lower end 24 of thread repair insert 12 continues to travel into the opening in the parent material, the diameter of the thread repair insert 12 increases due to the angle of the tapered section 50. Once the thread repair insert 12 is inserted far enough for the parent material to reach the partial threads 27b, the cutting edge 44 cuts away the parent material while leaving parent material in the spaces between the partial threads 27b. As the thread repair insert 12 continues to be inserted farther and farther into the parent material, the tapered section 50 continues to grow and grow in diameter, which causes the partial threads 27b to become fuller and fuller. This increase in diameter causes more and more material to be removed from the parent material where the partial threads 27b are present and while leaving more material between the partial threads 27b. Similarly, as the partial threads 27b grow in size, more and more material is forced between the partial threads 27b of threaded sections 36 under pressure. The iterative process of the threaded section 36 after threaded section 36 passing over the parent material and increasing in diameter with each pass causes increased cutting to the parent material and applies pressure forcing parent material between the gaps in the partial threads 27b, which causes a roll-forming process to create threads in the parent material. This is shown in the picture of FIG. 28, where partially formed threads in parent material are shown at the lower end of the picture, with the threads being increasingly formed as the thread repair insert 12 is further inserted into the parent material.

When the cut material exits the cutting section 32 the threads in the parent material are fully formed. Upon exiting the cutting section 32, the newly cut threads in the parent material enter the continuously threaded section above the cutting section 32. This engagement between the newly formed threads and the continuously threaded section continues to help to pull the thread repair insert 12 into the opening. This process continues until the thread repair insert 12 is fully inserted.

Once the thread repair insert 12 is fully inserted within the opening, a wrench is placed on the rotation mechanism 86 of the socket 16 to hold the socket 16, slug 14 and thread repair insert 12 in place. Once held in place, the rotation mechanism 108 of the cap screw 18 is rotated in the opposite direction, which breaks the solid connection between the cap screw 18 and the thread repair insert 12, slug 14 and socket 16 and the cap screw 18 is removed.

Once the cap screw 18 is removed, the socket 16 is removed.

Once the socket 16 is removed the slug 14 is removed by placing a socket or wrench on the rotation mechanism 76 and rotating the slug 14 out of the hollow interior 28 of thread repair insert 12. Once removed, the thread repair insert 12 is ready for use.

Angle of Cutting Edge: As described herein, the cutting edge 44 is slightly angled in the direction of rotation of thread repair insert 12. That is, the lower end 24 of cutting edge 44 is positioned forward, in the direction of rotation, of the upper end of cutting edge 44. This angle helps to cause the thread repair insert to bite or pull itself into the parent material during installation. The greater the angle of the cutting edge 44 the more thread repair insert 12 has a tendency to pull itself into the parent material. This angle helps to reduce the amount of pressure that must be applied to the thread repair insert 12 during the initial stages of the insertion process which eases the installation process.

That is, when the cutting edge 44 extends vertically, or said another way, at approximately 90° to the upper end 22 and lower end 24 of thread repair insert 12, the cutting edge 44 does not provide a force that helps to pull the thread repair insert 12 into the parent material during installation. The result is that substantial pressure must be applied during installation to get the thread repair insert 12 to bite into the parent material, which occurs when a substantial amount of threads are formed in the parent material by the cutting section 32. This additional pressure complicates the installation process and makes the installation process more-difficult ant therefore this is undesirable.

In contrast, when the cutting edge 44 angles slightly rearward, in the direction of rotation, as it extends upward, this angle of cutting edge 44 has a tendency to pull the thread repair insert 12 into the parent material during installation thereby reducing the amount of pressure a user must apply during the installation process, especially during the initial or beginning of the installation process. This angle is shown as γ in FIG. 17. Angles of 1° to 30° degrees have been tested with success, with particular results with angles at or around 10° as well as angles ranging from 5° to 15°, however any other angle is hereby contemplated for use including the following ranges: 9° to 11°, 8° to 12°, 7° to 14°, 6° to 15°, 5° to 16°, 4° to 17°, 3° to 18°, 2° to 19°, and 1° to 20°. The optimum angle for cutting edge 44 depends on multiple factors including the material of the parent material, the material of the thread repair insert 12, the hardening process or coating applied to the thread repair insert 12, the size of the thread repair insert 12, the depth of the opening in the parent material, the application (pneumatic, hydraulic, static, sparkplug, etc.), the number of notches 34, the size of notches 34, among other variables.

In contrast, angling the cutting edge 44 to extend forward, in the direction of rotation as it extends upward, would provide a force that would have a tendency to push the thread repair insert 12 out of the parent material as it is installed, which may have counterintuitive benefits in certain applications.

Modified Root Radius: As is described herein, the thread root 52 is generally modified as compared to standard. That is, during installation and use of thread repair insert 12 tremendous forces are applied along the length of thread repair insert 12. In some arrangements these forces are focused on the intersection between adjacent threads 27. That is, at the thread roots 52. This is because the thread roots 52 are the narrowest portions of the thread repair insert 12, and the converging planes of opposing sides 56 of opposing threads 27 create a natural cleave point or fracture point, where a crack has a natural tendency to form.

One way to prevent or reduce the formation of cracks at the thread root 52 is to form the thread root 52 in a curved or smooth manner that smoothly transitions one thread to the other, as is described herein, as opposed to having a sharp intersection at the thread root 52. Another manner of preventing or reducing the formation of cracks that the thread root 52 is to increase the size of the thread root 52 over what would be standard in a comparable thread.

That is, there are a number of governing bodies and published standards that apply to screw threads with the purpose being standardization between manufacturers. One such standard is known as the Unified Thread Standard (UTS) that defines a standard thread form and series, along with allowances, tolerances and designations for common screw threads. The UTS is the main standard for bolts, nuts, and a wide variety of other threaded fasteners used in the U.S. and Canada. The UTS is currently controlled by ASME/ANSI (American Society of Mechanical Engineers/American National Standards Institute) in the United States. These standards include: ANSI/ASME B1.1-2003 Unified Inch Screw Threads (UN and UNR Thread Form) V Thread Form; ASME B1.5-1997 (R2009) Acme Screw Threads Trapezoidal Thread Form; ANSI/ASME B1.9-1973 (R2001) Buttress Inch Screw Threads Breech-Lock Thread Form; ANSI/ASME B1.10M-1997 Unified Miniature Screw Threads V Thread Form; ANSI/ASME B1.11-1958 (R2001) Microscope Objective Thread V Thread Form; ASME B1.13M-2005 Metric Screw Threads: M Profile V Thread Form; ASME B1.15-1995 Unified Inch Screw Threads (UNJ Thread Form) V Thread Form; ANSVASME B1.20.1-1983 (R2006) Pipe Threads, General Purpose (Inch) Pipe Thread Form; ANSI B1.20.3-1976 (R2003) Dryseal Pipe Threads (Inch) Pipe Thread Form; ANSIIASME B1.20.7-1991 (R2003) Hose Coupling Screw Threads—Inch Pipe Thread Form; ANSI/ASME B1.21M-1997 (R2003) Metric Screw Threads—MJ Profile V Thread Form.

In contrast to these standards, in many applications it is desirable to increase the size of the thread root 52 over the established standard. That is, when the thread root 52 is a portion of a circle, increase the diameter of the circle that connects the inward end of adjacent sides 56 of adjacent threads 27. This has the effect of making the threads shallower which creates an increase in the thickness of the thread repair insert 12 at the thread root 52 which increases the strength of the thread repair insert 12 at the thread root 52. In addition, because the diameter of the thread root 52 is greater the transition from one thread 27 to the other thread 27 has a less aggressive curve, or a smoother transition, which reduces the possibility for crack propagation in the thread root 52.

This increase in size of the thread root 52 over the standard thread root size is in the range of 10% larger to 500% larger than the applicable standard.

Closed Insert: It is hereby contemplated that in one arrangement, as one example, the thread repair insert 12 is closed, or said another way, does not include a hollow bore that extends all the way through the thread repair insert 12 from upper end 22 to lower end 24.

Figure 29:
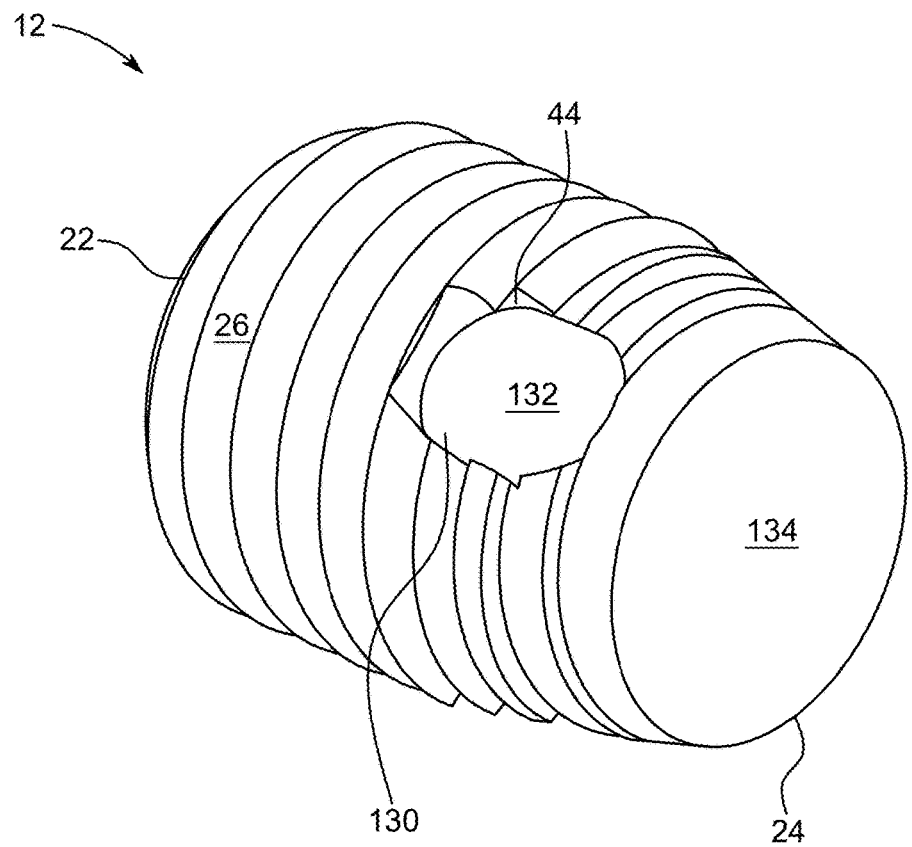
FIG. 29 is a perspective view of the thread repair insert from the lower end.
Figure 30:
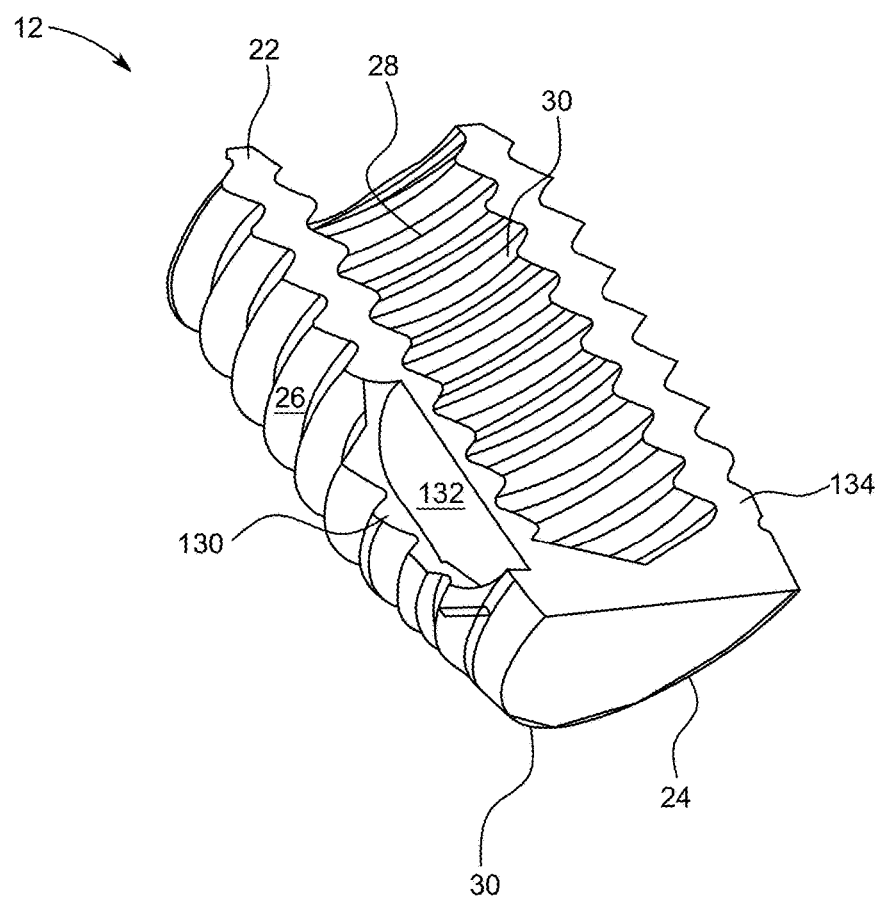
FIG. 30 is a cross-sectional view of the thread repair insert from FIG. 29.

In one arrangement, with reference to FIGS. 29 and 30, thread repair insert 12 includes a wall 134 that closes lower end 24. That is, thread repair insert 12 includes a hollow interior 28 with a threaded interior surface 30 that extends from the upper end 22 of thread repair insert 12 a distance before terminating in wall 134 that seals the lower end 24 of thread repair insert 12 from the opening in the parent material. In one arrangement, as is shown, the lower side of this lower wall 134 is in generally flat and flush alignment with the lower end 24 of thread repair insert 12. However, it is hereby contemplated that the wall 134 may be placed at any position within thread repair insert 12 and may begin or terminate at any position or have any thickness. In another arrangement, it is hereby contemplated that thread repair insert 12 has a completely solid body without a hollow interior 28, and in this arrangement wall 134 fills the entirety of hollow interior 28. While wall 134 is shown as flat, it is hereby contemplated that wall 134 may be curved, dished, recessed, protruding or the like. Wall 134 may be added to any embodiment.

Stud: In another arrangement, instead of thread repair insert 12 having a hollow interior 28 or even a solid interior, as is described above, thread repair insert 12 includes a stud, post or bolt that extends upward from upper end 22.

O-Ring Seal: In one arrangement, thread repair insert 12 includes an O-ring 120 that seals the thread repair insert 12 to the parent material.

Figure 32:
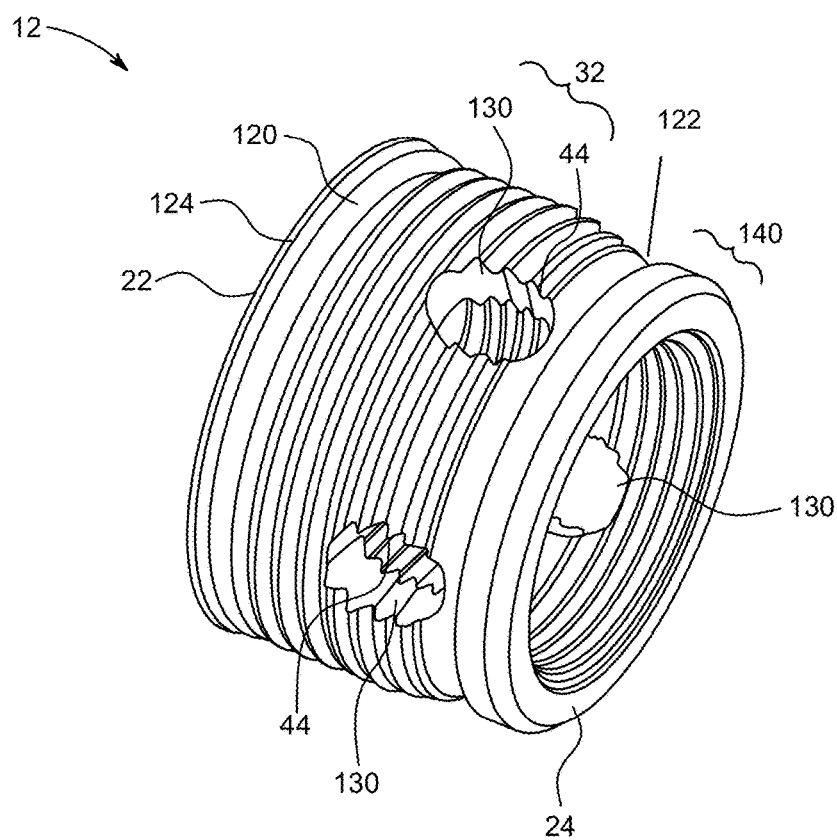
FIG. 32 is a perspective view of the thread repair insert from the lower end.

In one arrangement, with reference to FIG. 32, a generally round O-ring 120 (not shown in this figure)(however any other shaped O-ring is contemplated for use) is placed within a recess 122 adjacent the lower end 24 of the thread repair insert 12. In this arrangement, when the thread repair insert 12 is fully driven into the parent material, the O-ring 120 seals between the lower end 24 of the thread repair insert 12 and the bore in the parent material that was formed for the thread repair insert 12.

In another arrangement, with reference to FIG. 16, the upper end 22 of thread repair insert 12 includes a flange 124 that extends outward a distance past the exterior surface 26 of thread repair insert 12. Flange 124 may be formed as part of thread repair insert 12 or connected to thread repair insert 12. In this arrangement a generally flat O-ring 120 (however any other shaped O-ring is contemplated for use) is place under the flange 124. As the thread repair insert 12 is driven into the parent material, the O-ring 120 seals between the lower side of the flange 124 and the upper surface of the parent material adjacent to the opening in the parent material.

Figure 35:
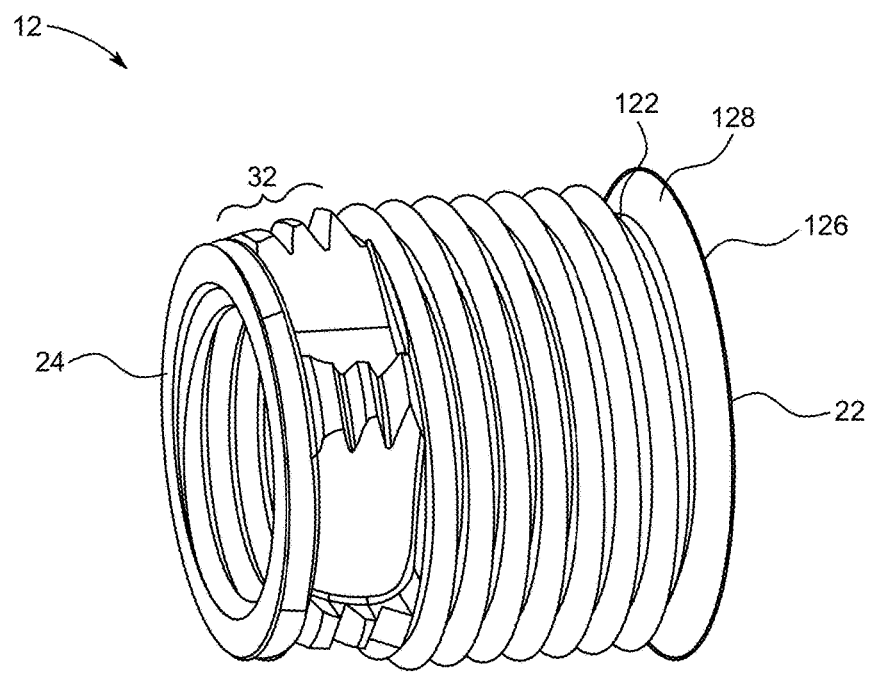
FIG. 35 is a perspective view of the thread repair insert from the lower end.

In another arrangement, with reference to FIG. 35 the upper end 22 of thread repair insert 12 includes a flange 124 that extends outward a distance past the exterior surface 26 of thread repair insert 12 at an angle with a recess or groove positioned below the flange 124. In this arrangement an O-ring 120 (not shown) is place under the flange 124 within the groove or recess 122. In this arrangement, the upper edge of the opening in the parent material is countersunk at distance and at an angle that corresponds to the angle of flange 124. As the thread repair insert 12 is driven into the parent material, the O-ring 120 seals between the lower side of the flange 124 and the countersunk surface in the upper edge of the parent material adjacent to the opening in the parent material.

Figure 33:
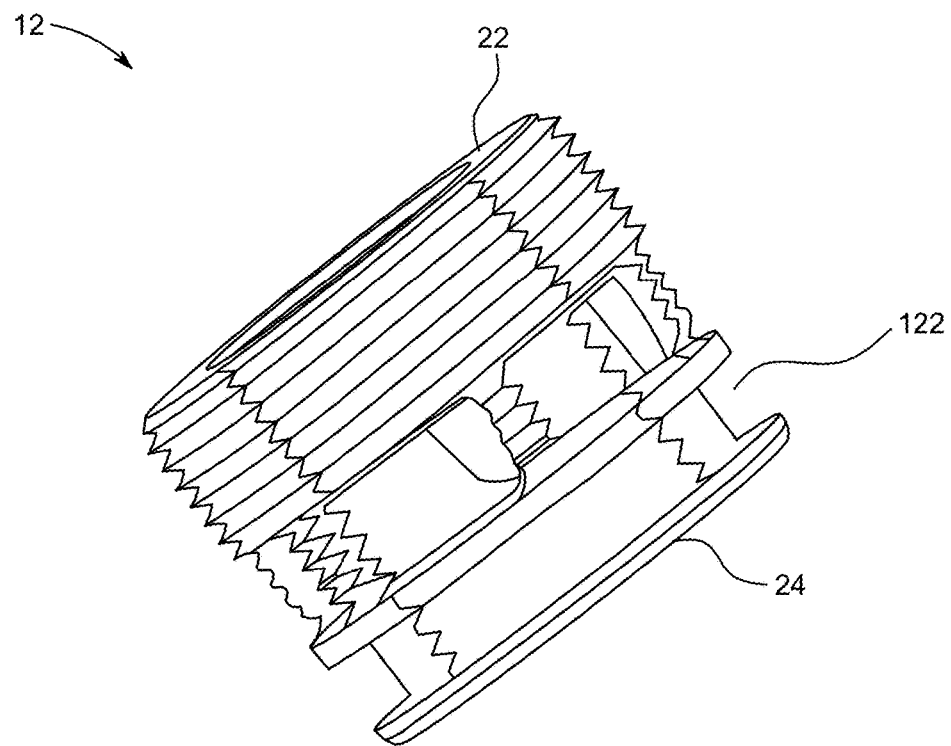
FIG. 33 is a side perspective view of the thread repair insert.

In another arrangement, with reference to FIG. 33, the lower end 24 of thread repair insert 12 includes a vertically elongated recess 122 or groove that receives an O-ring 120 (not shown) therein.

Figure 34:
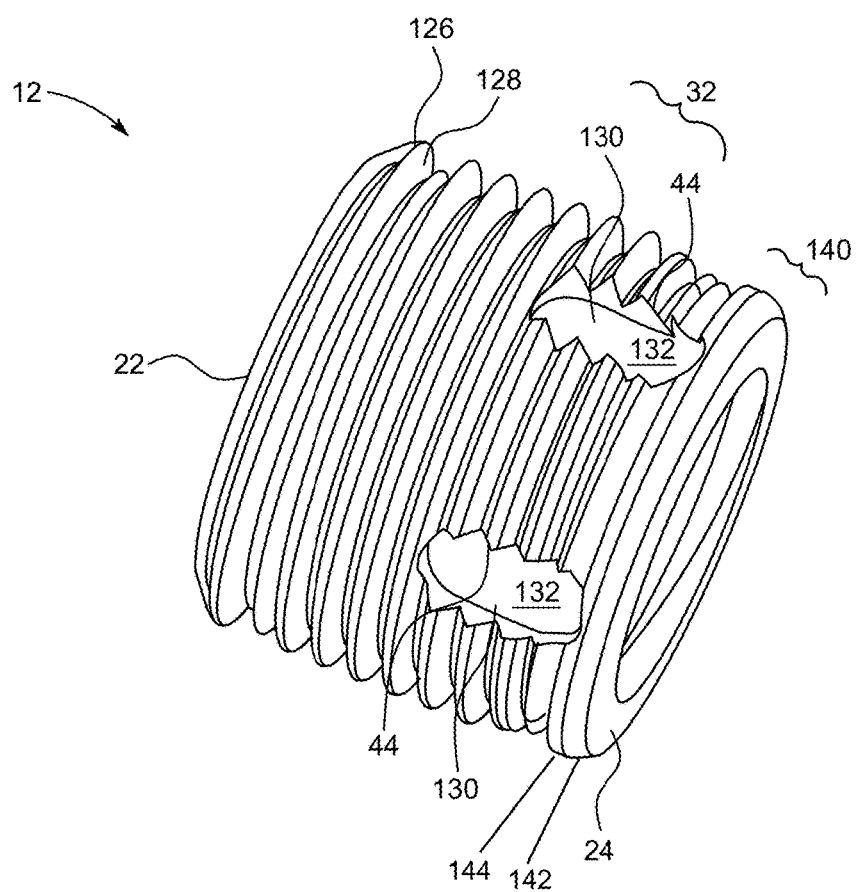
FIG. 34 is a side perspective view of the thread repair insert.

In yet another arrangement, with reference to FIG. 34, the upper end 24 of thread repair insert includes a mechanical crimp seal 126 that seals to the upper threaded area in the parent material. That is, in the arrangement shown, the upper end 24 of thread repair insert 12 includes a mechanical crimp seal 126 that is, in one arrangement, a flange that is slightly greater in diameter than the exterior surface 26 of thread repair insert 12 and includes a lower surface 128 that angles upward as it extends outward. Upon installation, when the thread repair insert 12 is driven into the parent material, the mechanical crimp seal 126 engages the upper most threads in the parent material and crimps or compresses them thereby sealing the thread repair insert 12 into the parent material. This arrangement shown in FIG. 34 also shows a cutting section 32 having openings 130 therein that have an interior wall 132 that seals opening 130 from the hollow interior 28 of thread repair insert 12. This arrangement is useful in hydraulic applications, sparkplug applications or any other application where it is impermissible to allow chips to fall out of the thread repair insert 12. This arrangement with wall 132 may be applied to any embodiment. In this arrangement the chips formed from the cutting process are held within the recess formed by the openings 130 and interior wall 132.

Thread Locking Compound: In one arrangement, thread locking compound is used in association with thread repair insert 12. Thread locking compound is any material that helps to seal and/or bond the thread repair insert 12 to the parent material. In one arrangement, thread locking compound is applied in a liquid or paste form to the exterior surface 26 of thread repair insert 12 and/or within notches 34 in the lower end 24 of thread repair insert 12. In one arrangement, the thread locking compound acts as a lubricant during installation and thereafter hardens thereby helping to hold the thread repair insert 12 in place within the parent material.

Figure 31:
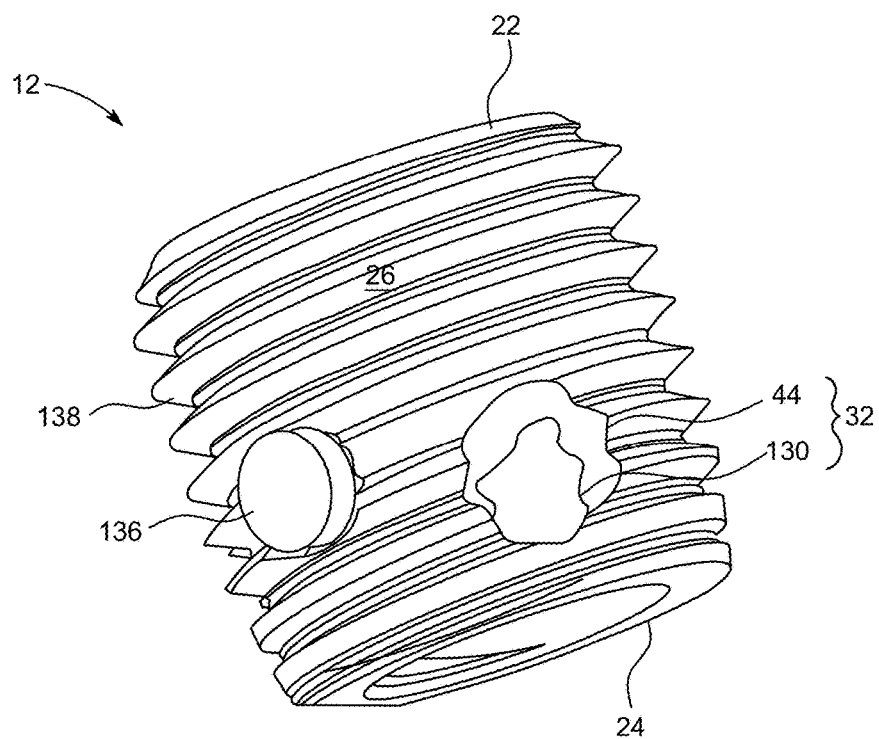
FIG. 31 is a perspective view of the thread repair insert from the lower end.

Anti-Rotation Element: In one arrangement, with reference to FIG. 31, thread repair insert 12 includes an anti-rotation element 136. Anti-rotation element 136 is formed of any suitable size, shape and design and is any device or element that serves to prevent rotation of thread repair insert 12 so as to prevent or help prevent the thread repair insert 12 from working its way out of the opening in parent material over time. In the arrangement shown, anti-rotation element 136 is a compressible member of material, such as rubber, plastic, nylon, composite, or any other material that is compressible or partially compressible, that is placed in a recess 138 in the exterior surface 26 of thread repair insert 12. In the arrangement shown, the anti-rotation element 136 is positioned slightly above or in the upper portion of the cutting section 32 so as to not interfere with the cutting process. As the thread repair insert 12 is inserted in the parent material the anti-rotation element 136 presses against the newly formed threads in the parent material and provides a force that helps to hold the thread repair insert 12 in place and helps to resist rotation.

Pilot Section: In one arrangement, with reference to FIGS. 32 and 34, the lower end 24 of thread repair insert 12 includes a pilot section 140. Pilot section 140 is formed of any suitable size, shape and design, and serves to help align and guide the thread repair insert into the opening in the parent material, especially at the start of the installation process. In one arrangement, as is shown, pilot section 140 includes a rounded outward edge 142 that connects a smooth cylindrical exterior surface 144 that is sized and shaped to fit within the prepared opening in the parent material within close tolerances. The rounded surface of outward edge 142 helps a user to insert the pilot section 140 into the opening in the parent material. The closely-sized smooth cylindrical exterior surface 144 of pilot section 140 helps to provide axial alignment of the thread repair insert 12 with the opening. In this way, when present, pilot section 140 helps to align the thread repair insert 12 into the opening in the parent material and eases the installation process.

Inverse: In the arrangement shown, a thread repair insert 12 is shown that rotates in a clockwise direction during installation. A counter-clockwise rotating thread repair insert 12 is hereby contemplated for use, which is the invers of what is shown.

Alternative Arrangements and Embodiments: While a plurality of alternative arrangements and embodiments have been presented herein, it is hereby contemplated that these features can be mixed and matched to any thread repair insert 12 presented herein. Nothing should be interpreted as limiting the combination of features shown in any one figure or embodiment to just that figure or embodiment.

Accordingly, from the above discussion it will be appreciated that the improved thread repair insert and method of use improves upon the present state of the art; provides a rugged repair; provides a permanent repair; provides a durable repair; has a long useful life; is easy to install; is repeatable; can be installed without highly specialized tooling; can be easily installed; can be quickly installed; does not require a skilled machinist to install; provides exceptional tear out strength; provides exceptional pull out resistance; does not require a custom manufactured solution for each repair; eliminates the need for welding; can be used in countless applications; can be used with any kind of thread design or style; is safe to use; is safe to install; provides a cost effective repair; is efficient to use; eliminates the need to replace larger parts or components; provides optimal wear resistance, among countless other improvements and advantages.

It will be appreciated by those skilled in the art that other various modifications could be made to the device without parting from the spirit and scope of this invention. All such modifications and changes fall within the scope of the claims and are intended to be covered thereby.

What is claimed:
1. A thread repair insert system, comprising:
a cylindrical body extending a length from an upper end to a lower end;
the cylindrical body having a threaded exterior surface, a hollow interior and an axis of rotation that extends through the approximate center of the hollow interior;
at least one notch placed adjacent the lower end of the cylindrical body;
wherein the at least one notch extends between a forward edge and a cutting edge;
wherein the at least one notch extends between an upper edge and a lower edge;
wherein the lower edge of the at least one notch connects with the lower end of the cylindrical body;
wherein the at least one notch has an exterior surface;
wherein exterior surface of the at least one notch forms a planar surface;
wherein the exterior surface of the at least one notch is recessed with respect to the threaded exterior surface at the cutting edge;
wherein the exterior surface of the at least one notch intersects with the threaded exterior surface at the forward edge;
wherein the planar surface of the exterior surface of the at least one notch extends in parallel spaced relation to the axis of rotation of the cylindrical body;
wherein the cutting edge of the at least one notch extends a length from a lower end to an upper end
wherein the cutting edge of the at least one notch extends in a straight manner from the lower end of the cutting edge to the upper end of the cutting edge;
wherein the cutting edge of the at least one notch intersects with the threaded exterior surface at an acute angle;
wherein the lower end of the cutting edge of the at least one notch is positioned forward, in a direction of rotation upon insertion into parent material, of the upper end of the cutting edge of the at least one notch;
wherein the lower end of the cutting edge of the at least one notch connects with the lower end of the cylindrical body;
wherein the upper edge of the at least one notch extends in a straight manner from a forward end to a rearward end;
wherein the at least one notch includes a corner section;
wherein the corner section of the least one notch smoothly transitions the straight cutting edge to the straight upper edge;
wherein the corner section of the at least one notch curves in an arcuate manner form the straight cutting edge to the straight upper edge;
wherein the forward end of the upper edge of the at least one notch intersects with the threaded exterior surface of the thread repair insert;
wherein the rearward end of the straight upper edge of the at least one notch connects to a forward end of the corner section;
wherein the upper edge of the at least one notch extends in approximate perpendicular alignment to the axis of rotation of the cylindrical body;
wherein the lower end of the cylindrical body includes a tapered section;
wherein the tapered section extends from an upper end to a lower end;
wherein the upper end of the tapered section intersects with the threaded exterior surface of the cylindrical body;
wherein the upper end of the tapered section intersects with the lower end of the cylindrical body;
wherein the tapered section narrows the diameter of the cylindrical body as it extends from the upper end of the tapered section to the lower end of the tapered section;
wherein when the thread repair insert is rotated into an opening in parent material, the cutting edge of the at least one notch cuts into the parent material and forms threads in the parent material;
wherein when the thread repair insert is rotated into an opening in the parent material, the combination of: the cutting edge of the at least one notch intersecting the threaded exterior surface at an acute angle; and the lower end of the cutting edge of the at least one notch being positioned forward, in a direction of rotation, of an upper end of the cutting edge of the at least one notch; and the at least one notch connecting at a corner section that smoothly transitions the cutting edge to an upper edge of the at least one notch, and the upper edge of the at least one notch extending in approximate perpendicular alignment to the axis of rotation; and the tapered section in the lower end of the cylindrical body cooperate to pull the thread repair insert into the parent material while forming threads thereby forming a strong connection between the thread repair insert and the parent material.

2. The thread repair insert system of claim 1, wherein the acute angle of the cutting edge of the at least one notch intersects with the threaded exterior surface at an acute angle in the range of 1° to 30°.

3. The thread repair insert system of claim 1, wherein the lower end of the cutting edge of the at least one notch is positioned forward, in the direction of rotation, of the upper end of the cutting edge of the at least one notch at an angle in the range of 1° to 10°.

4. The thread repair insert system of claim 1, wherein the corner section of the at least one notch is formed of a partial portion of a circle when viewed from the side.

5. The thread repair insert system of claim 1, wherein the cutting edge is formed of a straight planar edge.

6. The thread repair insert system of claim 1, wherein the upper edge of the at least one notch is formed of a straight planar edge.

7. The thread repair insert system of claim 1, further comprising the tapered section positioned in the lower end of the cylindrical body that causes the lower end of the cylindrical body to narrow in diameter at an angle as the cylindrical body extends downward at an angle between 1° to 30°.

8. The thread repair insert system of clam 1, further comprising at least one recess positioned in the upper end of the thread repair insert.

9. The thread repair insert system of claim 1, wherein the at least one notch is formed of six notches.

10. The thread repair insert system of claim 1, wherein the lower end of the hollow interior is closed by a wall.

11. The thread repair insert system of claim 1, further comprising an O-ring connected to the thread repair insert that serves to seal the thread repair insert to the parent material.

12. The thread repair insert of claim 1, further comprising a crimp seal connected to the upper end of the thread repair insert that serves to mechanically crimp against threads in the parent material.

13. The thread repair insert of claim 1, further comprising an anti-rotation element connected to the thread repair insert, wherein the anti-rotation element is configured to prevent unintentional rotation of the thread repair insert out of the parent material.

14. The thread repair insert system of claim 1, wherein the threads of the threaded exterior surface includes a modified thread root.

15. A thread repair insert system, comprising:
a cylindrical body;
the cylindrical body extending a length from an upper end to a lower end;
the cylindrical body having a threaded exterior surface, a hollow interior, a threaded interior surface and an axis of rotation;
the cylindrical body having a cutting section positioned adjacent the lower end;
the cutting section having at least one notch having a generally flat exterior surface;
the at least one notch having a cutting edge and a forward edge;
the cutting edge extending a length from an upper end to a lower end;
wherein the cutting edge of the at least one notch extends in a straight manner from the upper end of the cutting edge to the lower end of the cutting edge;
wherein the at least one notch extends between an upper edge and a lower edge;
wherein the lower edge of the at least one notch connects to the lower end of the cylindrical body;
the cylindrical body having a tapered section positioned in the lower end of the cylindrical body;
wherein the tapered section narrows the diameter of the thread repair insert as it extends downward;
wherein the flat exterior surface of the at least one notch extends in parallel spaced relation to the axis of rotation of the cylindrical body;
wherein the cutting edge of the at least one notch intersects with the threaded exterior surface at an acute angle;
wherein the lower end of the cutting edge of the at least one notch is positioned forward, in a direction of rotation upon insertion into parent material, of the upper end of the cutting edge of the at least one notch;
wherein the at least one notch includes a corner section;
wherein corner section at least one notch smoothly transitions the cutting edge to the upper edge;
wherein corner section of the at least one notch curves in an arcuate manner from the cutting edge to upper edge;
wherein a forward end of the upper edge of the at least one notch intersects with the threaded exterior surface of the thread repair insert;
wherein a rearward end of the upper edge of the at least one notch connects to a forward end of the corner section;
wherein the upper edge of the at least one notch extends in approximate perpendicular alignment to the axis of rotation of the cylindrical body;
wherein when the thread repair insert is rotated into an opening in parent material, the cutting edge of the at least one notch cuts into the parent material and forms threads in the parent material;
wherein when the thread repair insert is rotated into an opening in the parent material, the combination of: the cutting edge of the at least one notch intersecting the threaded exterior surface at an acute angle; and the lower end of the cutting edge of the at least one notch being positioned forward, in a direction of rotation, of an upper end of the cutting edge of the at least one notch; and the at least one notch connecting at a corner section that smoothly transitions the cutting edge to an upper edge of the at least one notch; and the upper edge of the at least one notch extending in approximate perpendicular alignment to the axis of rotation; and the tapered section in the lower end of the cylindrical body cooperate to pull the thread repair insert into the parent material while forming threads thereby forming a strong connection between the thread repair insert and the parent material.

16. A thread repair insert system, comprising:
a cylindrical body extending a length from an upper end to a lower end;
the cylindrical body having a threaded exterior surface, a hollow interior and an axis of rotation that extends through the approximate center of the hollow interior;
at least one notch placed adjacent the lower end of the cylindrical body;
wherein the at least one notch extends between a forward edge and a cutting edge;

wherein the at least one notch extends between an upper edge and a lower edge;
wherein the lower edge of the at least one notch connects with the lower end of the cylindrical body;
wherein the at least one notch has an exterior surface;
wherein the exterior surface of the at least one notch forms a planar surface;
wherein the exterior surface of the at least one notch is recessed with respect to the threaded exterior surface at the cutting edge;
wherein the exterior surface of the at least one notch intersects with the threaded exterior surface at the forward edge;
wherein the planar surface of the exterior surface of the at least one notch extends in parallel spaced relation to the axis of rotation of the cylindrical body;
wherein the cutting edge of the at least one notch extends a length from a lower end to an upper end;
wherein the cutting edge of the at least one notch extends in a straight manner from the lower end of the cutting edge to the upper end of the cutting edge;
wherein the cutting edge of the at least one notch intersects with the threaded exterior surface at an acute angle;
wherein the lower end of the cutting edge of the at least one notch is positioned forward, in a direction of rotation upon insertion into parent material, of the upper end of the cutting edge of the at least one notch;
wherein the lower end of the cutting edge of the at least one notch connects with the lower end of the cylindrical body;
wherein the upper edge of the at least one notch extends from a forward end to a rearward end;
wherein the at least one notch includes a corner section;
wherein the corner section of the at least one notch smoothly transitions the cutting edge to the upper edge;
wherein the corner section of the at least one notch curves in an arcuate manner from the cutting edge to the upper edge;
wherein the forward end of the upper edge of the at least one notch intersects with the threaded exterior surface of the thread repair insert;
wherein the rearward end of the upper edge of the at least one notch connects to a forward end of the corner section;
wherein the lower end of the cylindrical body includes a tapered section;
wherein the tapered section extends from an upper end to a lower end;
wherein the upper end of the tapered section intersects with the threaded exterior surface of the cylindrical body;
wherein the lower end of the tapered section intersects with the lower end of the cylindrical body;
wherein the tapered section narrows the diameter of the cylindrical body as it extends from the upper end of the tapered section to the lower end of the tapered section;
wherein when the thread repair insert is rotated into an opening in parent material, the cutting edge of the at least one notch cuts into the parent material and forms threads in the parent material;
wherein when the thread repair insert is rotated into an opening in the parent material, the combination of: the cutting edge of the at least one notch intersecting the threaded exterior surface at an acute angle; and the lower end of the cutting edge of the at least one notch being positioned forward, in a direction of rotation, of an upper end of the cutting edge of the at least one notch; and the at least one notch connecting at a corner section that smoothly transitions the cutting edge to an upper edge of the at least one notch; and the upper edge of the at least one notch extending in approximate perpendicular alignment to the axis of rotation; and the tapered section in the lower end of the cylindrical body cooperate to pull the thread repair insert into the parent material while forming threads thereby forming a strong connection between the thread repair insert and the parent material.

* * * * *

UNITED STATES PATENT AND TRADEMARK OFFICE
CERTIFICATE OF CORRECTION

PATENT NO.       : 10,337,551 B2
APPLICATION NO.  : 15/337846
DATED            : July 2, 2019
INVENTOR(S)      : Foerster, Jr.

It is certified that error appears in the above-identified patent and that said Letters Patent is hereby corrected as shown below:

In the Claims

Claim 1, in Column 19, Lines 63-64 should read as follows:
wherein the exterior surface of the at least one notch forms a planar surface;

Claim 1, in Column 20, Lines 29-31 should read as follows:
wherein the corner section of the at least one notch curves in an arcuate manner from the straight cutting edge to the straight upper edge;

Claim 1, in Column 20, Lines 48-49 should read as follows:
wherein the lower end of the tapered section intersects with the lower end of the cylindrical body;

Claim 15, in Column 22, Lines 24-27 should read as follows:
wherein the corner section of the at least one notch smoothly transitions the cutting edge to the upper edge;
wherein the corner section of the at least one notch curves in an arcuate manner from the cutting edge to the upper edge;

Signed and Sealed this
Tenth Day of September, 2019

Andrei Iancu
*Director of the United States Patent and Trademark Office*